(12) United States Patent
Cui et al.

(10) Patent No.: US 12,167,267 B2
(45) Date of Patent: Dec. 10, 2024

(54) RADIO RESOURCE MANAGEMENT SCALING FACTOR ENHANCEMENT WITHOUT MEASUREMENT GAPS

(71) Applicant: Apple Inc., Cupertino, CA (US)

(72) Inventors: Jie Cui, San Jose, CA (US); Yang Tang, San Jose, CA (US); Qiming Li, Beijing (CN); Manasa Raghavan, Sunnyvale, CA (US); Huaning Niu, San Jose, CA (US); Hong He, San Jose, CA (US); Xiang Chen, Campbell, CA (US); Dawei Zhang, Saratoga, CA (US); Haitong Sun, Cupertino, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,495

(22) PCT Filed: Oct. 23, 2020

(86) PCT No.: PCT/CN2020/123297
§ 371 (c)(1),
(2) Date: Sep. 21, 2021

(87) PCT Pub. No.: WO2022/082746
PCT Pub. Date: Apr. 28, 2022

(65) Prior Publication Data
US 2023/0269616 A1 Aug. 24, 2023

(51) Int. Cl.
*H04W 24/10* (2009.01)
(52) U.S. Cl.
CPC .................................. *H04W 24/10* (2013.01)

(58) Field of Classification Search
None
See application file for complete search history.

(56) References Cited

U.S. PATENT DOCUMENTS

| 11,304,208 B2 | 4/2022 | Siomina |
| 2021/0014751 A1* | 1/2021 | Callender ......... H04W 72/0446 |

(Continued)

FOREIGN PATENT DOCUMENTS

| CN | 110178406 A | 8/2019 |
| EP | 4124097 A1 | 1/2023 |

(Continued)

OTHER PUBLICATIONS

International Search Report and Written Opinion of the International Searching Authority directed to related International Patent Application No. PCT/CN2020/123297, mailed Jul. 22, 2021; 8 pages.

(Continued)

*Primary Examiner* — Phirin Sam
(74) *Attorney, Agent, or Firm* — Sterne, Kessler, Goldstein & Fox P.L.L.C.

(57) ABSTRACT

Some embodiments include a system, method, and computer program product for radio resource management (RRM) scaling factor enhancement without measurement gaps (MGs) in an E-UTRA-New Radio (NR) Dual Connectivity (EN-DC) network. Some embodiments include a user equipment (UE) that receives from a Primary Node (PN), a first NR measurement object (MO) without MG associated with a frequency. The UE receives from a Secondary Node (SN), a second NR MO without MG associated with the same frequency. The UE allocates resources based on a Primary (Continued)

Secondary Component Carrier (PSCC) and determines a scaling factor for determining a total procedure period for obtaining measurements to satisfy the first and the second NR MO without MG. Some embodiments include combining counts of NR MO without MG at a same frequency. Some embodiments include coordination between the PN and the SN so that MOs without MG at a common frequency satisfy the merging rule.

20 Claims, 14 Drawing Sheets

(56) References Cited

U.S. PATENT DOCUMENTS

| | | | |
|---|---|---|---|
| 2021/0051618 A1* | 2/2021 | Yang | H04W 48/08 |
| 2021/0235536 A1* | 7/2021 | Shih | H04W 76/27 |
| 2021/0258866 A1* | 8/2021 | Chou | H04W 48/16 |
| 2021/0298048 A1* | 9/2021 | Sosnin | H04W 72/046 |
| 2023/0125702 A1* | 4/2023 | Velev | H04W 8/04 370/329 |
| 2023/0164598 A1* | 5/2023 | Yao | H04W 24/04 370/252 |
| 2023/0363028 A1* | 11/2023 | Da Silva | H04W 76/15 |

FOREIGN PATENT DOCUMENTS

| | | | |
|---|---|---|---|
| WO | WO 2019/193125 A1 | 10/2019 | |
| WO | WO 2020/060951 A1 | 3/2020 | |
| WO | WO 2022/082630 A1 | 4/2022 | |

OTHER PUBLICATIONS

Media Tech Inc., "Inter-frequency Measurement Requirement Without Gap," 3GPP TSG-RAN WG4 Meeting #94-e, R4-2000460, Mar. 6, 2020; Retrieved Sep. 16, 2021; 5 pages.

Huawei et al., "CR on Correction to CSSF Within Gap R15," 3GPP TSG-RAN4 #96-e, R4-2011132, Aug. 28, 2020; Retrieved Sep. 16, 2021; 7 pages.

Nokia et al., "Discussion on Measurement Gaps for NR," 3GPP TSG-RAN WG4 Meeting #84, R4-1707459, Aug. 25, 2017; Retrieved Sep. 16, 2021; 4 pages.

Partial Supplementary European Search Report of the European Patent Office directed to related European Patent Application No. 20958328.5, mailed Jun. 12, 2024; 18 pages.

Huawei et al. "Motivation for Further RRM Enhancement in Rel-17," 3GPP TSG RAN Meeting #88e, RP-201031, Electronic Meeting, Jun. 29-Jul. 3, 2020, 4 Pages.

CMCC: "WF on Inter-Frequency Without MG," 3GPP RSG-RAN WG4 Meeting #93, R4-1915853, Reno, USA, Nov. 18-22, 2019, 15 pages.

CMCC: "TP on Introducing Inter-Frequency Measurements Without Measurement Gap," 3GPP TSG-RAN WG4 Meeting #94-e-Bis, R4-2003518, Electronic Meeting, Apr. 20-30, 2020, 18 pages.

Office Action and Search Report directed to related Chinese Application No. 202080106509.8, with machine translation attached, mailed Jul. 18, 2024; 18 pages.

3GPP TS 38.133 V16.5.0, 3rd Generation Partnership Project; Technical Specification Group Radio Access Network; NR; Requirements for support of radio resource management (Release 16), Section 9.1.5.1.1, Oct. 9, 2020; 2 pages.

* cited by examiner

RADIO RESOURCE MANAGEMENT SCALING FACTOR ENHANCEMENT WITHOUT MEASUREMENT GAPS

This application is a U.S. National Phase of International Application No. PCT/CN2020/123297, filed Oct. 23, 2020, which is hereby incorporated by reference in its entirety.

BACKGROUND

Field

The described embodiments relate generally to E-UTRA-NR Dual Connectivity (EN-DC) wireless communications.

Related Art

E-UTRA-NR Dual Connectivity (EN-DC) wireless communications systems include user equipment (UE) communicating with an EN-DC network regarding measurement objects.

SUMMARY

Some embodiments include a system, method, and computer program product for radio resource management (RRM) scaling factor enhancement without measurement gaps (MGs) in an E-UTRA-New Radio (NR) Dual Connectivity (EN-DC) network. Some embodiments include a user equipment (UE) that receives from a Primary Node (PN), a first NR measurement object (MO) without MG associated with a frequency. The UE receives from a Secondary Node (SN), a second NR MO without MG associated with the same frequency. The UE allocates resources based on a Primary Secondary Component Carrier (PSCC) and determines a scaling factor for determining a total procedure period for obtaining measurements to satisfy the first and the second NR MO without MG. Some embodiments include combining counts of NR MO without MG at a same frequency. Some embodiments include coordination between the PN and the SN so that MOs without MG at a common frequency satisfy a merging rule and can be combined.

In some embodiments, a UE implements Carrier Aggregation (CA) and receives a first inter-Radio Access Technology (RAT) NR MO without MG from a PN of the EN-DC network, where the first inter-RAT NR MO without MG is associated with a NR serving carrier frequency. The UE also receives a first intra-frequency NR MO without MG from a SN of the EN-DC network, where the first intra-frequency NR MO without MG is associated with the same NR serving carrier frequency. The UE obtains measurements for the inter-RAT NR MO without MG and the intra-frequency NR MO without MG, and transmits measurements correspondingly to the PN and the SN.

In some embodiments the NR serving carrier frequency is within: an NR PSCC or a NR Secondary Component Carrier (SCC), where the NR SCC includes a component carrier within: an NR SCC configured with neighbor cell measurements (SCC-NC), or a NR SCC configured with serving cell measurements. In some embodiments the inter-RAT NR MO without MG corresponds to the NR serving carrier frequency or one or more NR inter-frequencies, where the one or more NR inter-frequencies are different than a NR serving carrier frequency.

When the CA comprises Frequency Range 1 (FR1) frequencies, and where the NR serving carrier frequency is within an NR PSCC, the UE determines a procedure period, T, for completing: the inter-RAT NR MO without MG or the intra-frequency NR MO without MG. Based at least on the PSCC, the received inter-RAT NR MO without MG, and received the intra-frequency NR MO without MG, determine a carrier-specific scaling factor (CSSF), where a total procedure period for obtaining the measurements equals=CSSF·T.

In some embodiments the UE determines a first number of intra-frequency NR MOs without MG corresponding to one or more NR SCCs of configured FR1 Secondary Cells (SCells) of the CA. The UE determines a second number of inter-RAT NR MOs without MG corresponding to the one or more NR SCCs excluding the first inter-RAT NR MO without MG, and a third number of configured inter-frequency MOs without MG. The UE sums the first, second, and third numbers, where the sum equals a procedure period scaling factor corresponding to one or more NR SCCs.

When the CA comprises intra-band Frequency Range 2 (FR2) frequencies, where a neighbor cell measurement is not required in the intra-band FR2 frequencies, and where the NR serving carrier frequency is within a NR PSCC, UE 110 applies a merging rule to the first inter-RAT NR MO without MG and the first intra-frequency NR MO without MG. UE 110 counts a resulting number of MOs without MG based at least on the application of the merging rule, where a procedure period scaling factor corresponding to the NR PSCC equals the resulting number of MOs without MG. The UE determines a first number of intra-frequency MOs without MG corresponding to one or more NR SCCs of configured intra-band FR2 SCells of the CA, and determines a second number of inter-RAT NR MOs without MG. The UE determines a third number of configured inter-frequency MOs without MG, and sums the first, second, and third numbers, where the sum equals a procedure period scaling factor corresponding to one or more NR SCCs.

In some embodiments where the CA comprises inter-band FR2 frequencies, where the NR serving carrier frequency is within an NR PSCC, the UE applies a merging rule to the inter-RAT NR MO without MG and the intra-frequency NR MO without MG. The UE counts a resulting number of MOs without MG based at least on the application of the merging rule, wherein a procedure period scaling factor corresponding to the NR PSCC equals the resulting number of MOs without MG.

In some embodiments where the CA comprises two operating bands within the inter-band FR2 frequencies, the UE receives a second inter-RAT NR MO without MG from the PN, where the second inter-RAT NR MO without MG is associated with a corresponding NR SCC-NC serving carrier frequency. The UE receives a second intra-frequency NR MO without MG from the SN, where the second intra-frequency NR MO without MG is associated with the NR SCC-NC serving carrier frequency. The UE determines a procedure period scaling factor corresponding to the NR SCC-NC based at least on the second inter-RAT NR MO without MG and the second intra-frequency NR MO without MG. To determine the procedure period scaling factor corresponding to the NR SCC-NC, the UE sums the second inter-RAT NR MO without MG and the second intra-frequency NR MO without MG.

In some embodiments the UE determines a third number of intra-frequency MOs without MG corresponding to one or more NR SCCs without neighbor cell measurements, of configured inter-band FR2 SCells of the CA excluding the second intra-frequency NR MO without MG corresponding to the NR SCC-NC. The UE determines a fourth number of inter-RAT NR MOs without MG excluding: the second inter-RAT NR MO without MG corresponding to the NR SCC-NC. The UE determines a fifth number of configured inter-frequency MOs without MG, and determines a procedure period scaling factor corresponding to NR SCC MOs without MG based at least on the third, fourth, and fifth numbers. To determine the procedure period scaling factor corresponding to NR SCC MOs without MG, the UE sums the third, fourth, and fifth numbers, and multiplies the sum by 2.

In some embodiments a NR SN configured to operate in an EN-DC network with CA receives, from an PN of the EN-DC network, a first set of parameters corresponding to a first NR MO without MG where the first NR MO without MG is associated with an NR serving carrier frequency. The SN configures, based at least on the first set of parameters, a second set of parameters corresponding to a second NR MO without MG, associated with the same NR serving carrier frequency, where the first NR MO without MG and the second NR MO without MG satisfy a merging rule. The SN transmits, to a UE, a signal comprising the second NR MO without MG, and receives from the UE, measurements corresponding to the second NR MO without MG.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
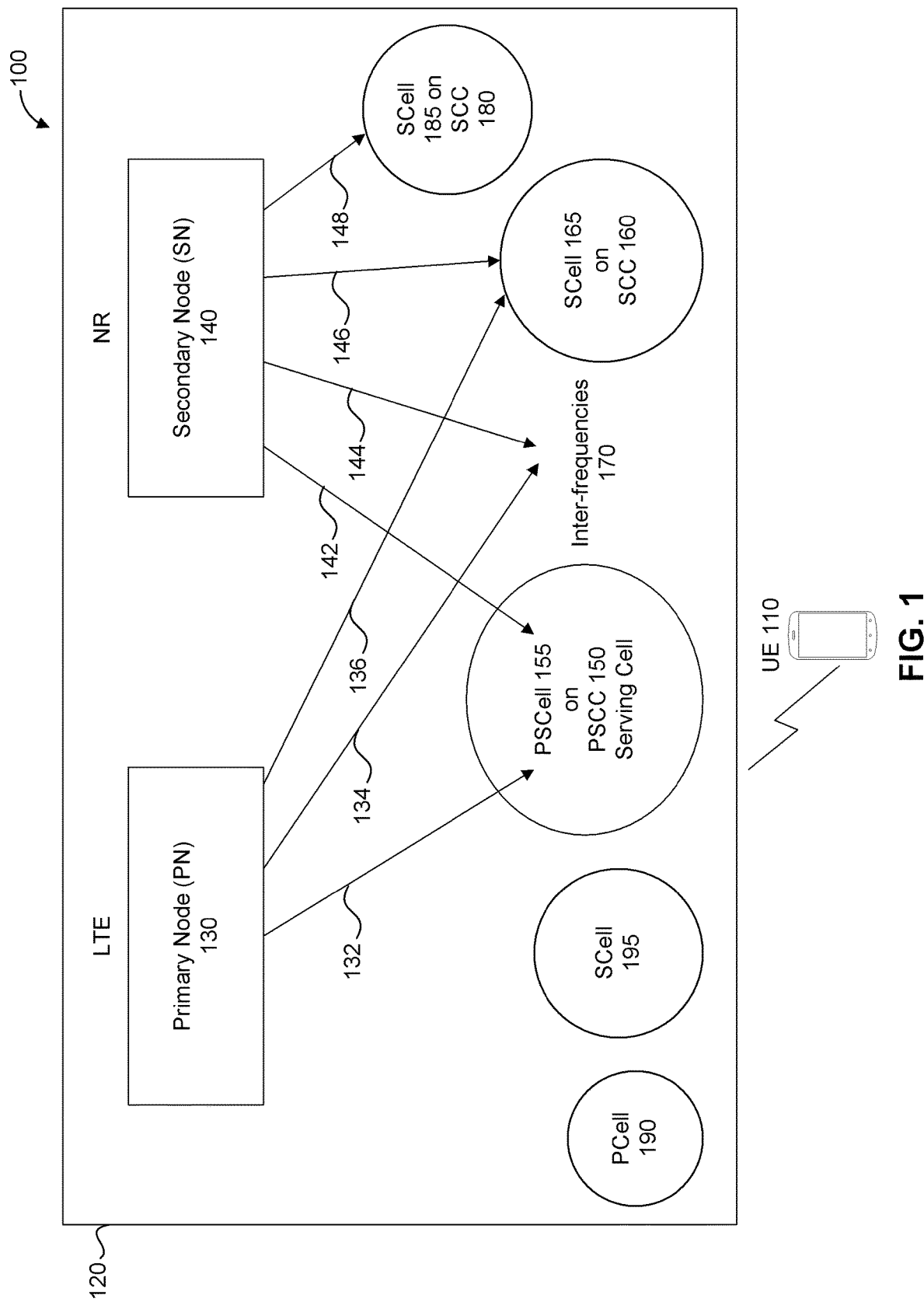
FIG. 1 illustrates an example of a Radio Resource Management (RRM) scaling factor enhancement without Measurement Gap (MG) system, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

An E-UTRA-New Radio (NR) Dual Connectivity (EN-DC) network communicating with a user equipment (UE) can request that the UE collect measurements of neighboring cells. The network configures a measurement object (MO) and transmits the MO to the UE. The UE collects the measurements according to the MO and provides the measurements to the network. The network uses the measurements to adjust settings and improve service to the UE. When Carrier Aggregation (CA) is applied, a UE can operate in different bandwidth parts (BWPs) where one BWP is active at a time. When an MO is to be measured on a frequency outside of the active BWP, the MO is performed during a Measurement Gap (MG). When the MO is to be measured on a frequency within the active BWP, the MO is considered to be an MO outside an MG, or an MO without MG.

Some embodiments enable a UE to manage radio resources to process one or more MOs outside MGs in different CA scenarios including but not limited to: Frequency Range 1 (FR1); Intra-band Frequency Range 2 (FR2); FR1 and FR2 where a Primary Secondary Cell (PSCell) is located in FR2; Inter-band FR2; and/or FR1 and FR2 where a PSCell is in FR1.

FIG. 1 illustrates example 100 of a Radio Resource Management (RRM) scaling factor enhancement without Measurement Gap (MG) system, in accordance with some embodiments of the disclosure. Example 100 includes UE 110 and EN-DC network 120. EN-DC network 120 includes two types of Radio Access Technologies (RAT): Long Term Evolution (LTE) with Primary Node (PN) 130 and New Radio (NR) with Secondary Node (SN) 140. Examples of NR include but is not limited to 5G communications as defined by 3rd Generation Partnership Project (3GPP) standards. For example, UE 110 can include an electronic device configured to operate using a 3GPP release, such as Release 17 (Rel-17), or other present/future 3GPP standards. UE 110 can be a computing electronic device such as a smart phone, cellular phone, and can include other computing devices including but not limited to laptops, desktops, tablets, personal assistants, routers, monitors, televisions, printers, and appliances.

PN 130 can manage the LTE portions of EN-DC network 120 including but not limited to: Primary Cell (PCell) 190 and a Secondary Cell (SCell) 195. SN 140 can manage NR portions of EN-DC network 120 including but not limited to: Primary Secondary Cell (PSCell) 155 corresponding to Primary Secondary Component Carrier (PSCC) 150; SCell 165 corresponding to Secondary Component Carrier (SCC) 160 and SCell 185 that operates on SCC 180; and inter-frequencies 170.

In example 100, PSCell 155 is the current serving cell for UE 110. PN 130 and SN 140 can configure UE 110 to process NR MOs without MGs. For example, SN 140 can configure UE 110 to process intra-RAT NR MOs without MGs including: intra-frequency NR MOs without MGs illustrated as information 142, 146, and 148; and inter-frequency NR MOs without MGs illustrated as information 144. PN 130 can configure UE 110 to process inter-RAT frequency NR MOs without MGs that include: intra-frequency NR MOs without MGs illustrated as information 132 and 136. Although not shown, an intra-frequency NR MO without MG can also be configured for SCC 180; and inter-frequency NR MOs without MGs illustrated as information 134. These are described further in FIGS. 3 and 4 below.

Example 100 can include the following CA scenarios: FR1; intra-band FR2; and a combination of FR1 and FR2 where FR2 includes the PSCell. For example, in the FR1 CA scenario, PSCC 150, SCC 160, SCC 180, and inter-frequencies 170 are in FR1. In the FR2 CA scenario, PSCC 150, SCC 160, SCC 180, and inter-frequencies 170 are in FR2. In the combination of FR1 and FR2 where FR2 includes the PSCell CA scenario, PSCC 150 is in FR2. SCC 160 and/or SCC 180 can operate in FR1 or FR2.

Figure 2:
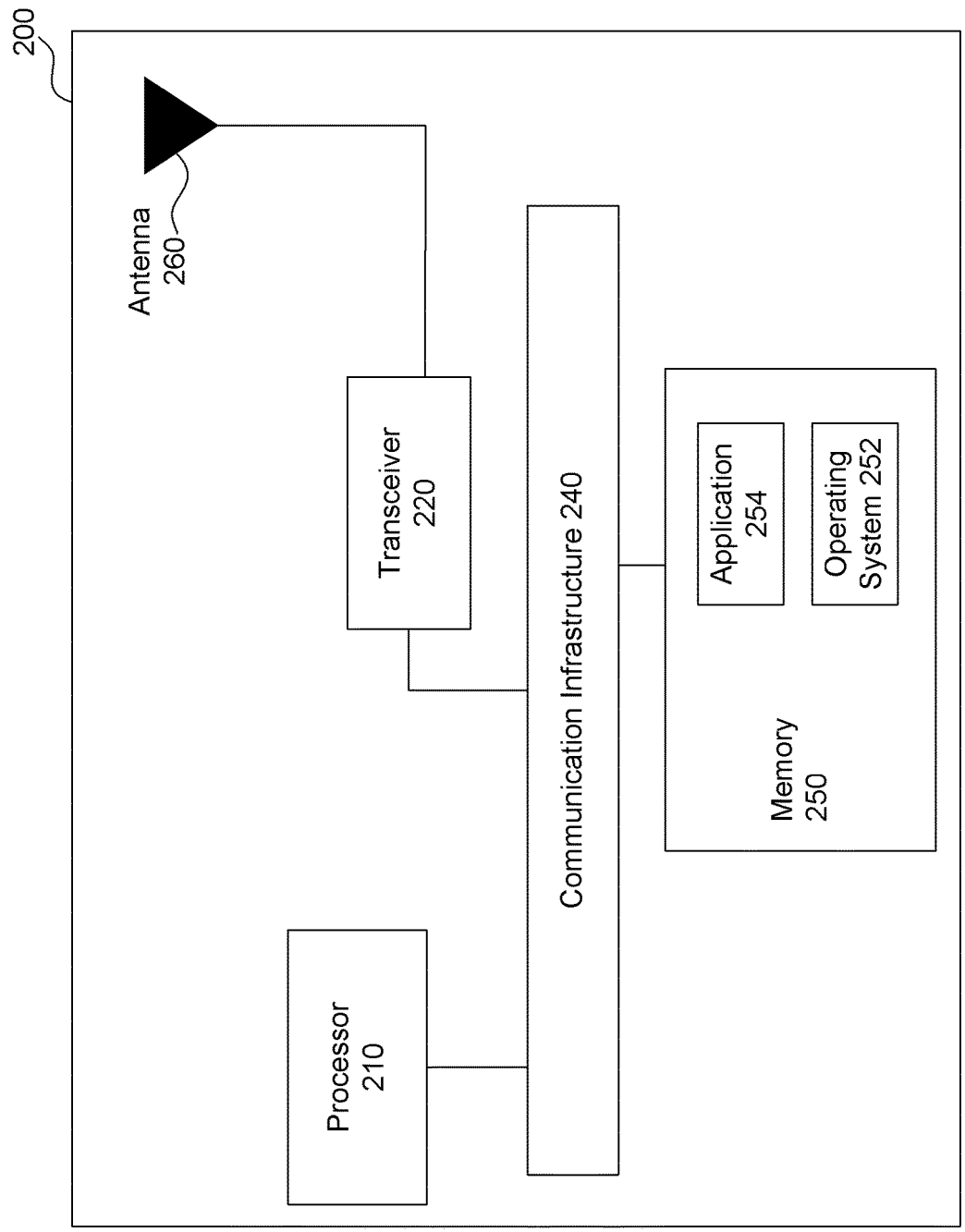
FIG. 2 illustrates a block diagram of an example system supporting RRM scaling factor enhancement without MG, according to some embodiments of the disclosure.

FIG. 2 illustrates a block diagram of an example system 200 supporting RRM scaling factor enhancement without MG, according to some embodiments of the disclosure. As a convenience and not a limitation, system 200, may be described with elements of FIG. 1. System 200 can be any of the electronic devices (e.g., UE 110, PN 130, and/or SN 140) of system 100. System 200 includes a processor 210, one or more transceivers 220, communication infrastructure 240, memory 250, operating system 252, application 254, and one or more antennas 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 can include random access memory (RAM) and/or cache, and can include control logic (e.g., computer software) and/or data. Memory 250 can include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, Siri™, FaceTime™, radio streaming, video streaming, remote control, and/or other user applications.

Processor 210 together with instructions stored in memory 250 performs operations enabling system 200 to implement mechanisms supporting RRM scaling factor enhancement without MG, including for example, determining scaling factors and processing NR MOs without MG. Application 254 can include measurement searcher resources (e.g., two measurement searcher resources) that are shared among the various Carrier Components (CCs). A measurement searcher resource corresponds to a memory allocation (e.g., a memory size) that processor 210 can utilize for buffering time domain sequences. When UE 110 has multiple CCs to measure, due to the limited memory allocation, processor 210 coordinates the measurement searcher resource for different to-be-measured CCs in a TDM manner, and therefore the measurement period for each CC can be extended by a scaling factor.

System 200 can also include communication infrastructure 240. Communication infrastructure 240 provides communication between, for example, processor 210, one or more transceivers 220, and memory 250. In some implementations, communication infrastructure 240 may be a bus.

One or more transceivers 220 transmit and receive communications signals that support mechanisms for RRM scaling factor enhancement without MG. According to some aspects, one or more transceivers 220 may be coupled to antenna 260. Antenna 260 may include one or more antennas that may be the same or different types. One or more transceivers 220 allow system 200 to communicate with other devices that may be wired and/or wireless. In some examples, one or more transceivers 220 can include processors, controllers, radios, sockets, plugs, buffers, and like circuits/devices used for connecting to and communication on networks. According to some examples, one or more transceivers 220 include one or more circuits to connect to and communicate on wired and/or wireless networks.

According to some aspects of this disclosure, one or more transceivers 220 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220 can include more or fewer systems for communicating with other devices.

In some examples, one or more transceivers 220 can include one or more circuits (including a WLAN transceiver) to enable connection(s) and communication over WLAN networks such as, but not limited to, networks based on standards described in IEEE 802.11.

Additionally, or alternatively, one or more transceivers 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceivers transceiver 620 can include a Bluetooth™ transceiver.

Additionally, one or more transceivers 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), mmWave systems, and the like. For example, one or more transceivers 220 can be configured to operate according to one or more of Rel-15, Rel-16, Rel-17, or other present/future 3GPP standards.

According to some aspects of this disclosure, processor 210, alone or in combination with computer instructions stored within memory 250, and/or one or more transceiver 220, implements the methods and mechanisms discussed in this disclosure. For example, processor 210, alone or in combination with computer instructions stored within memory 250, and/or one or more transceiver 220, implements mechanisms supporting RRM scaling factor enhancement without MG as shown in FIG. 1. According to some aspects of this disclosure, processor 210, alone or in combination with computer instructions stored within memory 250, and/or one or more transceiver 220, can determine corresponding scaling factors and process an NR MO without MG accordingly. In some embodiments, processor 210 can include its own internal memory (not shown), and/or be "hard-wired" (as in a state-machine) configured to enable RRM scaling factor enhancement without MG described herein.

Figure 3:
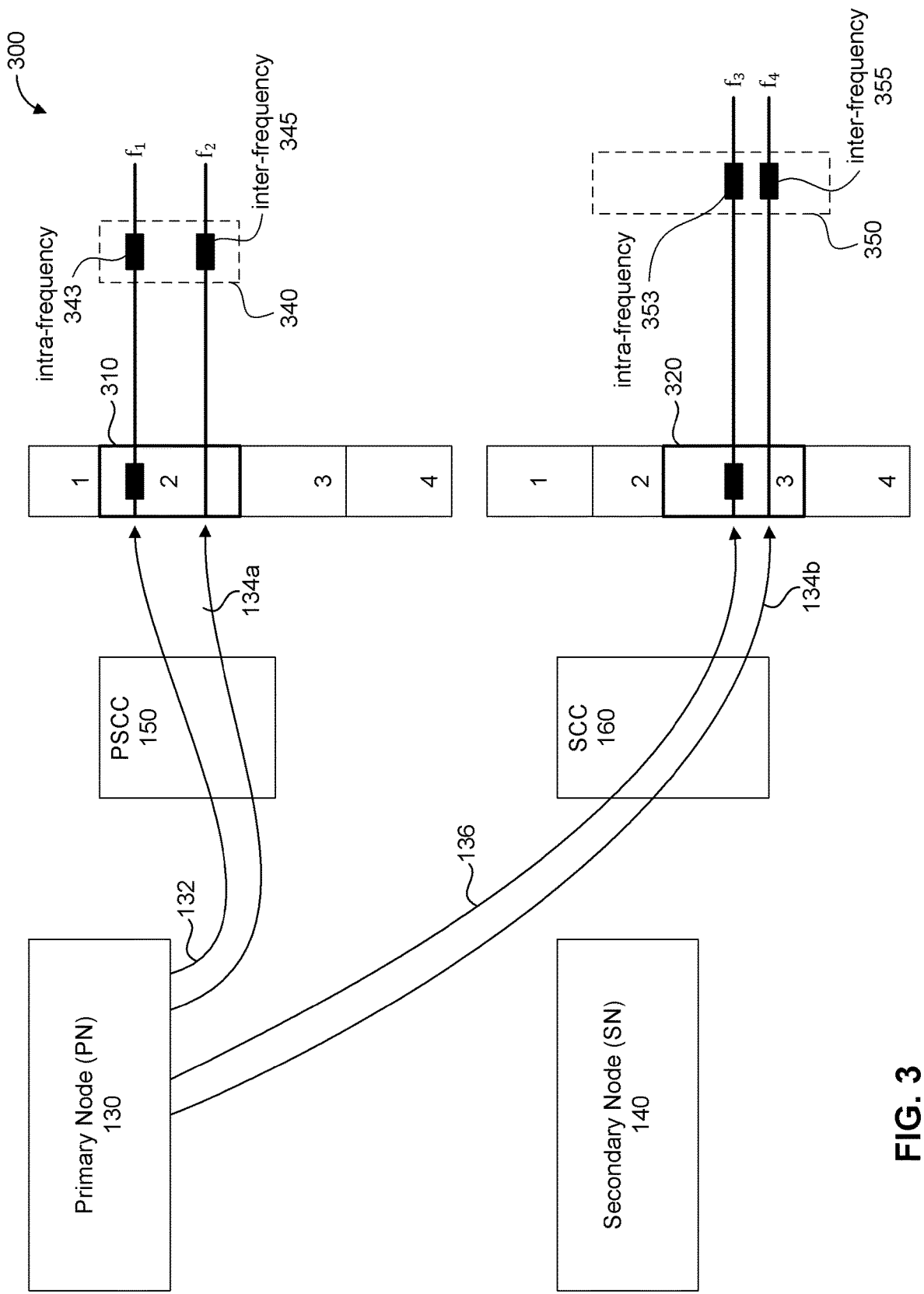
FIG. 3 illustrates information associated with an inter-Radio Access Technology (RAT) New Radio (NR) Measurement Objects (MO) without MG, according to some embodiments of the disclosure.

FIG. 3 illustrates example 300 of information associated with an inter-Radio Access Technology (RAT) New Radio (NR) Measurement Objects (MO) without MG, according to some embodiments of the disclosure. As a convenience and not a limitation, system 200, may be described with elements of other figures herein. Example 300 includes the Carrier Aggregation (CA) of Primary Secondary Component Carrier (PSCC) 150 and Secondary Component Carrier (SCC) 160. PSCC 150 includes 4 BWPs where BWP 2 is the Active BWP 310. The serving carrier frequency for PSCC is f1. SCC 160 includes 4 BWPs where BWP 3 is the Active BWP 320. The serving carrier frequency for SCC is f3. As shown, neighboring cell 340 also operates on frequencies f1 and f2. Neighboring cell 350 also operates on frequencies f3 and f4.

When UE 110 collects measurements for an NR MO on a frequency outside of Active BWP 310 or Active BWP 320, the NR MO measurements are collected during a defined time period called a Measurement Gap (MG). When UE 110 collects measurements for an NR MO outside of an MG, or in other words, the measurements are collected during Active BWP 310 or Active BWP 320, the NR MO is called an NR MO without MG.

PN 130 can configure UE 110 to process inter-RAT frequency NR MOs without MGs that can include: an intra-frequency NR MO without MG, and/or an inter-frequency NR MO without MG. To process an intra-frequency NR MO without MG, UE 110 collects measurements on a serving carrier frequency such as f1 for PSCC 150 and f3 for SCC 160. Information 132 illustrates information associated with a first intra-frequency NR MO without MG from PN 130 associated with the serving carrier frequency, f1, of PSCC 150. When UE 110 processes the first intra-frequency NR MO without MG at f1, UE 110 can collect measurements during a Synchronization Signal Block (SSB) of neighboring cell 340 noted as intra-frequency 343. Information 136 illustrates information associated with a second intra-frequency NR MO without MG from PN 130 associated with the serving carrier frequency, f3, of SCC 150. When UE 110 processes the second intra-frequency NR MO without MG at f3, UE 110 can collect measurements during an SSB of neighboring cell 350 noted as intra-frequency 353.

To process an inter-frequency NR MO without MG from PN 130, UE 110 collects measurements on a frequency within an Active BWP that is not a serving carrier frequency. For example, an inter-frequency in Active BWP 310 cannot be serving carrier frequency such as f1 for PSCC 150, or in Active BWP 320, cannot be serving carrier frequency f3 for SCC 160. Information 134a illustrates information associated with a first inter-frequency NR MO without MG from PN 130 associated with the serving carrier frequency, f1, of PSCC 150. When UE 110 processes the inter-frequency NR MO without MG at f1, UE 110 can collect measurements during an SSB of neighboring cell 340 noted as inter-frequency 345. Information 134b illustrates information associated with a second inter-frequency NR MO without MG from PN 130 associated with the serving carrier frequency, f3, of SCC 160. When UE 110 processes the inter-frequency NR MO without MG at f3, UE 110 can collect measurements during a SSB of neighboring cell 350 noted as inter-frequency 355. In some embodiments an inter-frequency NR MO without MG is associated with a CC (e.g., PSCC 150 or SCC 160) and/or a serving carrier frequency (e.g., f1 or f3).

Figure 4:
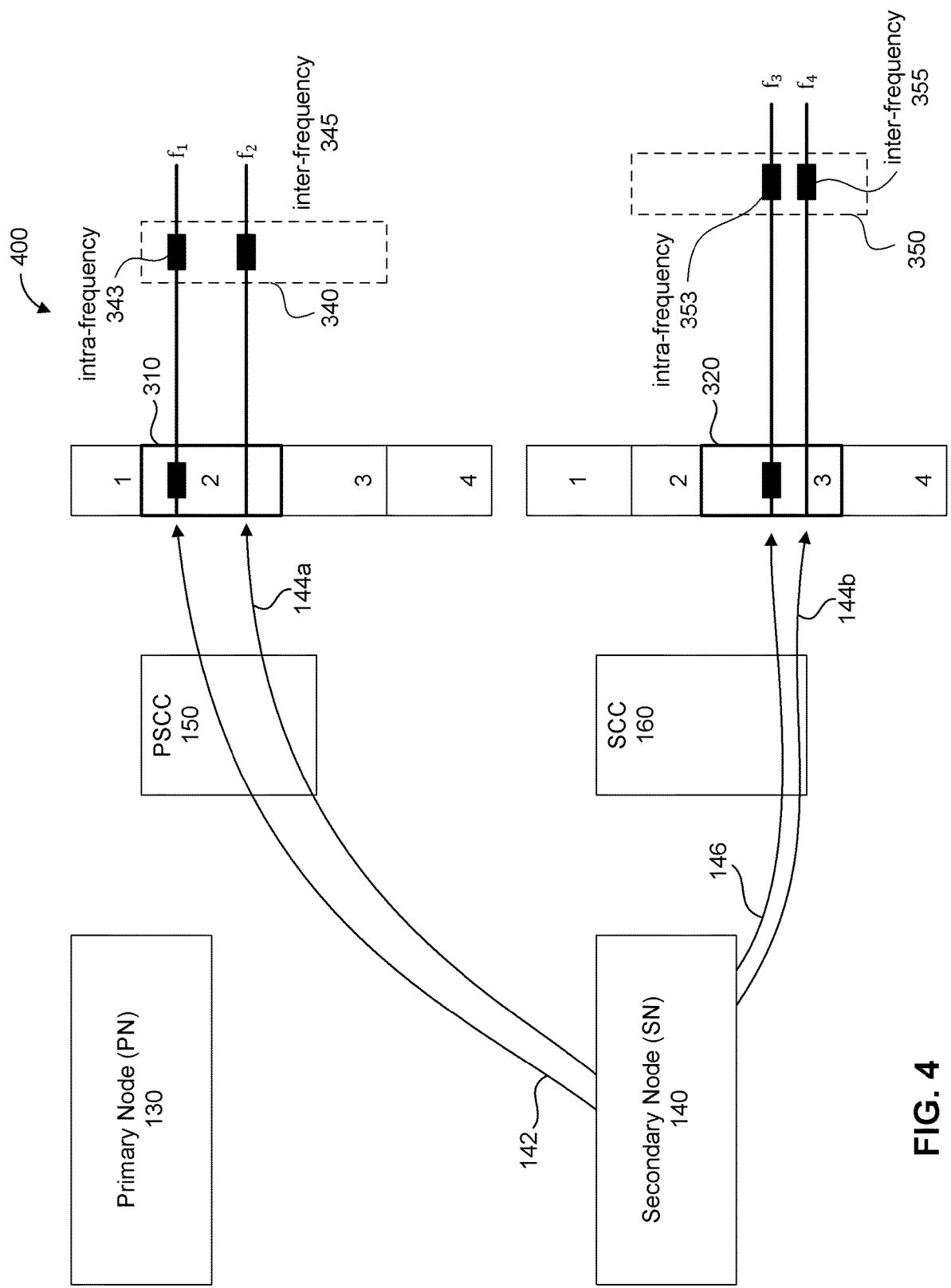
FIG. 4 illustrates information associated with an intra-RAT NR MO without MG, according to some embodiments of the disclosure.

FIG. 4 illustrates example 400 of information associated with an intra-RAT NR MO without MG, according to some embodiments of the disclosure. As a convenience and not a limitation, example 400, may be described with elements of other FIGS. herein. SN 140 can configure UE 110 to process intra-RAT NR MO without MG including: intra-frequency MOs without MGs illustrated as information 142, 146, and 148 of FIG. 1; and inter-frequency NR MOs without MGs illustrated as information 144. To process an intra-frequency NR MO without MG from SN 140, UE 110 collects measurements a serving carrier frequency such as f1 for PSCC 150 and f3 for SCC 160. Information 142 illustrates information associated with a first intra-frequency NR MO without MG from SN 140 associated with the serving carrier frequency, f1, of PSCC 150. When UE 110 processes the intra-frequency NR MO without MG at f1, UE 110 can collect measurements during an SSB of neighboring cell 340 noted as intra-frequency 343. Information 146 illustrates information associated with a second an intra-frequency NR MO without MG from SN 140 associated with the serving carrier frequency, f3, of SCC 150. When UE 110 processes the intra-frequency NR MO without MG at f3, UE 110 can collect measurements during an SSB of neighboring cell 350 noted as intra-frequency 353.

To process an inter-frequency NR MO without MG from SN 140, UE 110 collects measurements on a frequency within an Active BWP that is not a serving carrier frequency. For example, an inter-frequency in Active BWP 310 cannot be serving carrier frequency such as f1 for PSCC 150, or in Active BWP 320, cannot be serving carrier frequency f3 for SCC 160. Information 144a illustrates information associated with a first inter-frequency NR MO without MG from SN 140 associated with the serving carrier frequency, f1, and/or PSCC 150. When UE 110 processes the inter-frequency NR MO without MG at f1 and/or PSCC 150, UE 110 can collect measurements during an SSB of neighboring cell 340 noted as inter-frequency 345. Information 144b illustrates information associated with a second inter-frequency NR MO without MG from SN 140 associated with the serving carrier frequency, f3, and/or SCC 150. When UE 110 processes the inter-frequency NR MO without MG at f3 and/or SCC 150, UE 110 can collect measurements during a SSB of neighboring cell 350 noted as inter-frequency 355.

Figure 5:
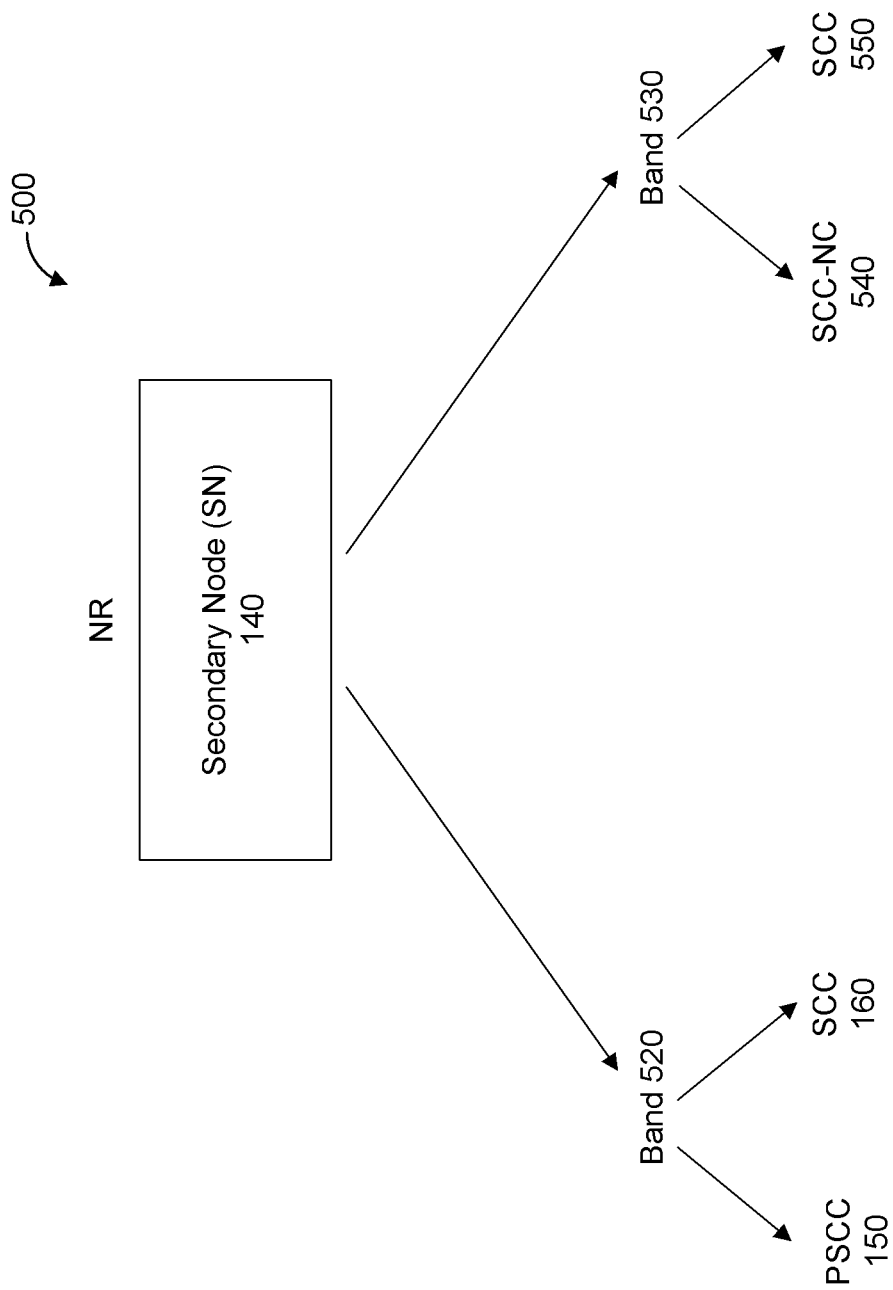
FIG. 5 illustrates an example of an RRM scaling factor enhancement without MG system with a Secondary Component Carrier (SCC)-Neighbor Cell (NC), in accordance with some embodiments of the disclosure.

FIG. 5 illustrates example 500 of an RRM scaling factor enhancement without MG system with a Secondary Component Carrier (SCC)-Neighbor Cell (NC), in accordance with some embodiments of the disclosure. As a convenience and not a limitation, example 500, may be described with elements of other figures herein. For example SN 140 of FIG. 1 is shown with two frequency bands, band 520 and band 530. Example 500 can include the following CA scenarios: Inter-band FR2; and a combination of FR1 and FR2 where FR1 includes the PSCell. For example, in the inter-band FR2 CA scenario, band 520 operating in FR2 includes PSCC 150 and SCC 160. In band 530, also operating in FR2, an SCC takes on neighbor cell measurement functions (similar to that of a PSCC). That SCC is called an SCC-Neighbor Cell (SCC-NC). In example 500, band 530 includes SCC-NC 540 as well as SCC 550. In the combination of FR1 and FR2 where FR1 includes the PSCell CA scenario, band 520 operating in FR1 includes PSCC 150 and SCC 160. Band 530 operating in FR2 and includes SCC-NC 540 as well as SCC 550.

Figure 6:
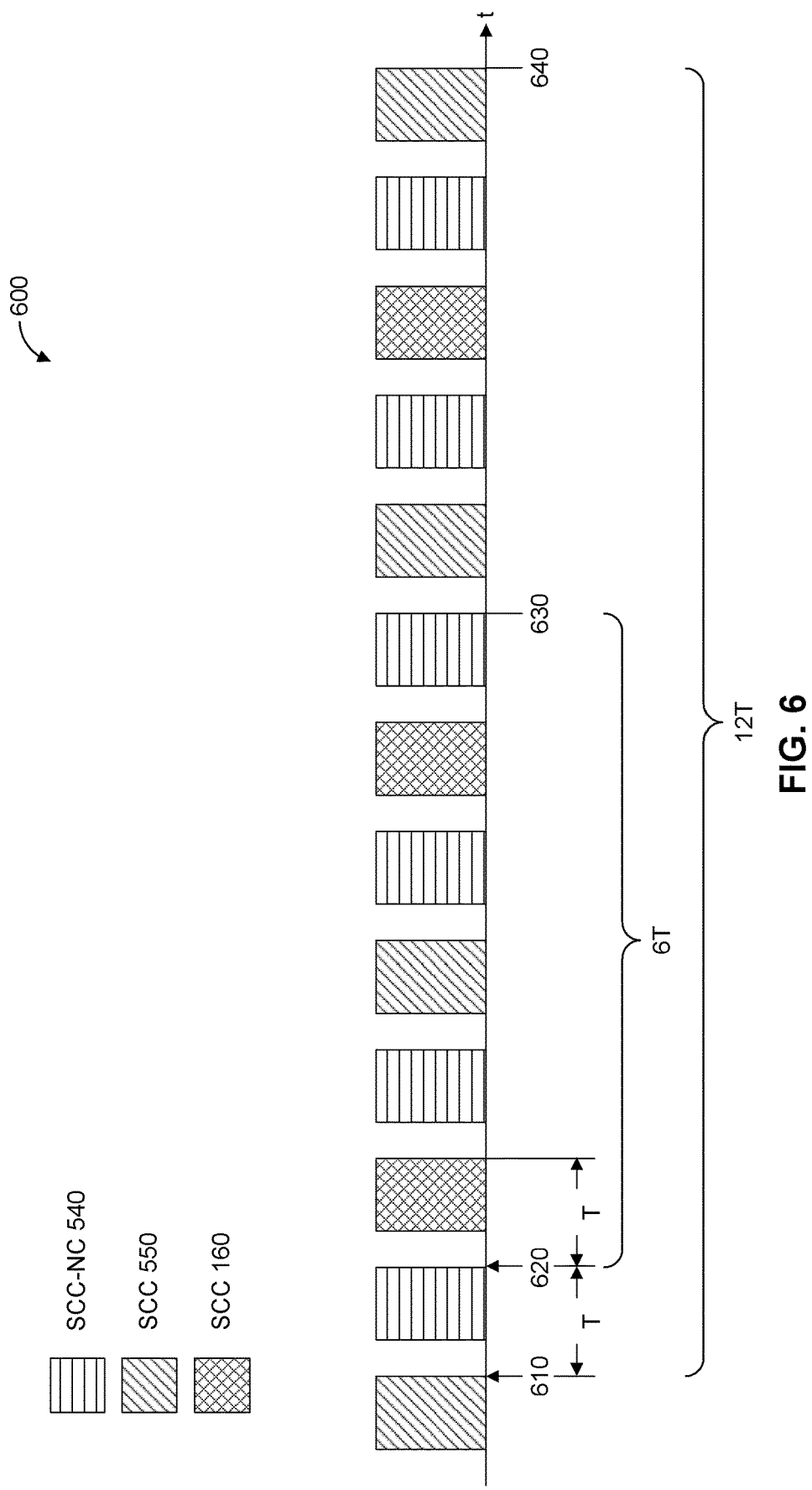
FIG. 6 illustrates an example of a Carrier-Specific Scaling Factor (CSSF) in accordance with some embodiments of the disclosure.

FIG. 6 illustrates example 600 of a Carrier-Specific Scaling Factor (CSSF) in accordance with some embodiments of the disclosure. As a convenience and not a limitation, example 600, may be described with elements of other figures herein. In some embodiments, UE 110 may include limited resources for processing NR MO without MG. In an example, UE 110 may have two resources (e.g., two searcher functions) that are shared among the various Carrier Components (CCs). UE 110 may prioritize a first resource for processing any NR MO without MG for PSCC 150, and utilize the second resource for processing any NR MO without MG for SCCs. In example 100 of FIG. 1, if UE 110 received a first NR MO without MG for SCC 160 and a second NR MO without MG for SCC 180, UE 110 can alternate the collection of measurements during a procedure period, T, to satisfy the first and the second NR MO without MG. In this example, the first NR MO without MG or the second NR MO without MG can be completed within a procedure period, T. Because of the sharing, the total procedure period for collecting measurements for the first NR MO without MG may be twice as long (e.g., 2·T). Similarly, the total procedure period for collecting measurements for the second NR MO without MG may be twice as long (e.g., 2·T).

In example 500 of FIG. 5, however, SCC-NC 540, SCC 550, and SCC 160 share the second resource. But SCC-NC 540 has additional functions to perform and UE 110 can prioritize NR MO without MG for SCC-NC 540 as a higher priority than the remaining SCCs (e.g., SCC 160 and SCC 550.) For example, UE 110 can assign 50% of the second resource for SCC-NC 540 and the remaining 50% to the combination of SCC 160 and SCC 550. In example 600, SCC-NC 540, SCC 160, and SCC 550 correspond to a first, second, and a third NR MO without MG configured at UE 110, where each NR MO without MG takes a baseline processing time of 3T to complete. Because SCC-NC 540 is allocated 50% of the second resource, the first NR MO without MG for SCC-NC 540 is completed in 6T starting from time 620 to time 630. Thus, the baseline processing time of 3T has been doubled (e.g., 3T·2=6T) or in other words, scaled by 2. The second and third NR MOs without MG share the remaining 50% second resource. As shown in example 600, the second NR MO without MG for SCC 550 is completed in 12T starting from time 610 to time 640. Thus, the baseline processing time of 3T has been scaled by 4 (e.g., 3T·4=12T.) Similarly, the third NR MO without MG for SCC 160 is also completed in 12T and the baseline processing time of 3T has been scaled by 4. In other words, the Carrier-Specific Scaling Factor (CSSF)=4.

In some embodiments, UE 110 counts inter-RAT NR MO without MG configured from PN 130 and intra-frequency NR MO without MG from SN 140 separately (e.g., independently of each other) even if they are directed to the same frequency. For example, when UE 110 receives intra-frequency NR MO without MG or inter-RAT NR MO without MG configured on PSCC 150, UE 110 determines that a corresponding CSSF=1. For example, when UE 110 receives both intra-frequency NR MO without MG and inter-RAT NR MO without MG configured on PSCC 150, UE 110 determines that a corresponding CSSF=2. CSSF values for various CA scenarios are described in corresponding tables below.

In a CA scenario for UE 110 operating in FR1 (e.g., EN-DC with FR1 only CA), some embodiments for CSSF values in an EN-DC network are shown in Table 1. CSSF in CA Scenario: FR1. For example, in the FR1 CA scenario, PSCC 150, SCC 160, SCC 180, and inter-frequencies 170 of FIG. 1 are in FR1. The first column describes $CSSF_{outside\_gap,i}$ for FR1 PSCC 150, where i represents the target frequency, and the CSSF factor is applied to the measurement delay of carrier i. As described with regard to example 600, UE 110 can prioritize a first resource (e.g., searcher) for processing NR MOs without MG corresponding to PSCC 150. For example, when UE 110 processes intra-frequency NR MO without MG configured on PSCC 150 from SN 140 (e.g., related to information 142 of FIG. 4), UE 110 utilizes the first resource to complete the measurements. CSSF='1' (e.g., i corresponds to f1, the serving carrier frequency of PSCC 150) as the first resource is not shared. Likewise, when UE 110 processes inter-RAT NR MO without MG configured on PSCC 150 from PN 130 (e.g., related to information 132 of FIG. 3), UE 110 utilizes the first resource to complete the measurements. Again, CSSF='1' as the first resource is not shared. When both intra-frequency NR MOs without MG from SN 140 and inter-RAT NR MOs without MG from PN 130 are configured on PSCC 150 (e.g., related to both information 142 and 132), UE 110 shares the first resource (e.g., alternates measurements collected from intra-frequency NR MO without MG with measurements collected from inter-RAT NR MO without MG). UE 110 determines that the CSSF='2' as the baseline processing time will take twice as long to complete.

The second column describes $CSSF_{outside\_gap,i}$ for FR1 SCC 160. For example, UE 110 determines: the number of intra-frequency NR MOs without MG configured FR1 SCell(s) (e.g., related to information 146 for SCC 160 of FIG. 4, and/or equivalent for SCC 180 (not shown)); the number of inter-RAT NR MOs without MG (e.g., related to information 136 of FIG. 3 and/or equivalent for SCC 180 not shown); and Y, where Y represents the number of configured inter-frequency NR MOs without MG (e.g., related to information 134*a* and 144*a*, for Active BWP 310 at inter-frequency 345, related to information 134*b* and 144*b* for Active BWP 320 at inter-frequency 355, and/or equivalent for SCC 180 not shown). The third and fourth columns are described as above and are not repeated here.

TABLE 1

| CSSF$_{outside\_gap, i}$ for FR1 PSCC | CSSF$_{outside\_gap, i}$ for FR1 SCC | CSSF$_{outside\_gap, i}$ for inter-frequency MO with no MG | CSSF$_{outside\_gap, I}$ for inter-RAT NR measurement |
|---|---|---|---|
| '1' when only intra-frequency NR MO or only inter-RAT NR MO is configured on this PSCC; '2' when both intra-frequency NR MO and inter-RAT NR MO are configured on this PSCC | Number of configured FR1 SCell(s) + number of inter-RAT NR MO without MG + Y | Number of configured FR1 SCell(s) + number of inter-RAT NR MO without MG + Y | Number of configured FR1 SCell(s) + number of inter-RAT NR MO without MG + Y |

In a CA scenario for UE 110 operating in intra-band FR2 (e.g., EN-DC with FR2 only intra-band CA), some embodiments for CSSF values in an EN-DC network are shown in Table 2. CSSF in CA Scenario: Intra-band FR2. In the intra-band FR2 CA scenario, PSCC 150, SCC 160, SCC 180, and inter-frequencies 170 of FIG. 1 are in FR2. The first column describes CSSF$_{outside\_gap,i}$ for FR2 PSCC 150. As described with regard to example 600, UE 110 can prioritize a first resource (e.g., searcher) for processing NR MOs without MG corresponding to PSCC 150. For example, when UE 110 processes intra-frequency NR MO without MG configured on PSCC 150 from SN 140 (e.g., related to information 142 of FIG. 4), UE 110 utilizes the first resource to complete the measurements. CSSF='1' as the first resource is not shared. Likewise, when UE 110 processes inter-RAT NR MO without MG is configured on PSCC 150 from PN 130 (e.g., related to information 132 of FIG. 3), UE 110 utilizes the first resource to complete the measurements. Again, CSSF='1' as the first resource is not shared. When both intra-frequency NR MO without MG from SN 140 and inter-RAT NR MO without MG from PN 130 are configured on PSCC 150 (e.g., related to both information 142 and 132), UE 110 shares the first resource (e.g., alternates measurements collected from the intra-frequency NR MO without MG with measurements collected from the inter-RAT NR MO without MG). UE 110 determines that the CSSF='2' as the baseline processing time will take twice as long to complete.

The second column describes CSSF$_{outside\_gap,i}$ for FR2 SCC 160 where neighbor cell measurement is not required (e.g., SCC 160 is not a SCC-NC). For example, UE 110 determines: the number of intra-frequency NR MOs without MG configured FR2 SCell(s) (e.g., related to information 146 for SCC 160 of FIG. 4, and equivalent for SCC 180 (not shown)); the number of inter-RAT NR MOs without MG (e.g., related to information 136 of FIG. 3 and equivalent for SCC 180 not shown); and Y, where Y represents the number of configured inter-frequency NR MOs without MG (e.g., related to information 134a and 144a, for Active BWP 310 at inter-frequency 345, related to information 134b and 144b for Active BWP 320 at inter-frequency 355, and/or equivalent for SCC 180 not shown). The third and fourth columns are described as above and are not repeated here.

TABLE 2

| CSSF$_{outside\_gap, i}$ for FR2 PSCC | CSSF$_{outside\_gap, i}$ for FR2 SCC where neighbor cell measurement is not required | CSSF$_{outside\_gap, i}$ for inter-frequency MO with no MG | CSSF$_{outside\_gap, I}$ for inter-RAT NR measurement |
|---|---|---|---|
| '1' when only intra-frequency NR MO or only inter-RAT NR MO is configured on this PSCC; '2' when both intra-frequency NR MO and inter-RAT NR MO are configured on this PSCC | Number of configured FR2 SCells + number of inter-RAT NR MO without MG + Y | Number of configured FR2 SCells + number of inter-RAT NR MO without MG + Y | Number of configured FR2 SCells + number of inter-RAT NR MO without MG + Y |

In a CA scenario for UE 110 operating in inter-band FR2, some embodiments for CSSF values in an EN-DC network are shown in Table 3. CSSF in CA Scenario: Inter-band FR2. For example, in the inter-band FR2 CA scenario, band 520 operating in FR2 includes PSCC 150 and SCC 160 as shown in FIG. 5. In band 530, also operating in FR2, includes SCC-NC 540 as well as SCC 550. Column 1 is identical to Column 1 of Table 2. CSSF in CA Scenario: Intra-band FR2, and is not repeated here.

Column 2 describes CSSF$_{outside\_gap,i}$ for FR2 SCC-NC 540 where neighbor cell measurement is required. Selection of FR2 SCC-NC 540 can follow clause 9.2.3.2 of 3GPP TS38.133. As shown in example 600 of FIG. 6, UE 110 can designate a second resource to be shared among NR MOs without MG corresponding to one or more SCCs. Because SC-NCC 540 is an inter-band CC peer to PSCC 150 as shown in FIG. 5, UE 110 can designate 50% of the second resource for SC-NCC 540 and the remaining 50% to the remaining SCCs to share (e.g., SCC 160 and SCC 550 of FIG. 5.) In example 600, SCC-NCC 540 is configured to correspond with either intra-frequency NR MO without MG, or inter-RAT NR MO without MG. And as shown above, CSSF='2'. When both intra-frequency NR MOs without MG and inter-RAT NR MOs without MG are configured on SCC-NC 540 (not shown in FIG. 6), UE 110 can alternate measurements and thus the scaling factor will be doubled. Accordingly, CSSF='4'. In some embodiments if SCC-NC 540 is the only SCC configured and there are no inter-frequency NR MOs without MG, then CSSF='1'.

Column 3 describes $CSSF_{outside\_gap,i}$ for FR2 SCC where neighbor cell measurement is not required. Some embodiments include UE 110 determining a CSSF based on NR MOs without MG corresponding to SCCs (e.g., SCC 160, SCC 550) excluding SCC-NC 540. For example, if CSSF='2' from Column 2, (e.g., see example 600 of FIG. 6), UE 110 can arrange for the NR MOs without MG configured for the SCCs to share the remaining 50% of the second resource. Accordingly, UE 110 multiplies by 2, a sum of: the number of intra-frequency NR MOs without MG configured FR2 SCell(s) (e.g., SCC 160 and SCC 550); the number of inter-RAT NR MOs without MG configured to SCC 160 and SCC 550; Y, where Y represents the number of configured inter-frequency NR MOs without MG; and −1. The subtraction of 1 corresponds with either the intra-frequency NR MO without MG, or inter-RAT NR MO without MG associated with SCC-NC 540 determined in Column 2. In example 500, MOs without MG configured for SCC 160 and SCC 550; Y, where Y represents the number of configured inter-frequency NR MOs without MG; and −2. The subtraction of 2 corresponds with both the intra-frequency NR MO without MG and inter-RAT NR MO without MG associated with SCC-NC 540 determined in Column 2. In example 500, when there is an inter-RAT NR MO without MG configured by PN 130, and no inter-frequency NR MO without MG, the Column 3 CSSF=2×(Number of configured SCell(s)+number of inter-RAT NR measurement without MG+Y−2)=2*(3+1+0−2)=4. Note SCC-NC is also one of the SCCs, so the number of configured SCell(s)=3. The number of inter-RAT NR measurement without MG is 1 on the SCC-NC because the CSSF=4 from Column 2. Thus, both PN 130 and SN 140 configured NR MOs without MG on SCC-NC 540.

The fourth and fifth columns are described as above and are not repeated here.

TABLE 3

| | | | | |
|---|---|---|---|---|
| | | CSSF in CA Scenario: Inter-band FR2 | | |
| $CSSF_{outside\_gap, i}$ for FR2 PSCC | $CSSF_{outside\_gap, i}$ for FR2 SCC where neighbor cell measurement is required | $CSSF_{outside\_gap, i}$ for FR2 SCC where neighbor cell measurement is not required | $CSSF_{outside\_gap, i}$ for inter-frequency MO with no MG | $CSSF_{outside\_gap, I}$ for inter-RAT NR measurement |
| '1' when only intra-frequency NR MO or only inter-RAT NR MO is configured on this PSCC; '2' when both intra-frequency NR MO and inter-RAT NR MO are configured on this PSCC | '2' when only intra-frequency NR MO or only inter-RAT NR MO is configured on this SCC (this SCC is inter-band CC to PSCC); '4' when both intra-frequency NR MO and inter-RAT NR MO are configured on this SCC (this SCC is inter-band CC to PSCC) | 2 × (Number of configured SCell(s) + number of inter-RAT NR measurement without MG + Y − 1) if $CSSF_{outside\_gap, i}$ = 2 for FR2 SCC where neighbor cell measurement is required; 2 × (Number of configured SCell(s) + number of inter-RAT NR measurement without MG + Y − 2) if $CSSF_{outside\_gap, i}$ = 4 for FR2 SCC where neighbor cell measurement is required. | 2 × (Number of configured SCell(s) + number of inter-RAT NR measurement without MG + Y − 1) if $CSSF_{outside\_gap, i}$ = 2 for FR2 SCC where neighbor cell measurement is required; 2 × (Number of configured SCell(s) + number of inter-RAT NR measurement without MG + Y − 2) if $CSSF_{outside\_gap, i}$ = 4 for FR2 SCC where neighbor cell measurement is required. | 2 × (Number of configured SCell(s) + number of inter-RAT NR measurement without MG + Y − 1) if $CSSF_{outside\_gap, i}$ = 2 for FR2 SCC where neighbor cell measurement is required; 2 × (Number of configured SCell(s) + number of inter-RAT NR measurement without MG + Y − 2) if $CSSF_{outside\_gap, i}$ = 4 for FR2 SCC where neighbor cell measurement is required. | when there is no inter-RAT NR MO without MG configured by PN 130, and no inter-frequency NR MO without MG, the Column 3 CSSF=2×(Number of configured SCell(s)+number of inter-RAT NR measurement without MG+Y−1)=2*(3+0+0−1)=4. Note SCC-NC is also one of the SCCs, so the number of configured SCell(s)=3.

When CSSF='4' from Column 2, both intra frequency NR MOs without MG and inter-RAT NR MOs without MG are configured on the SCC-NC 540. As described above, UE 110 can arrange for the NR MOs without MG configured for the SCCs to share the remaining 50% of the second resource. UE 110 multiplies by 2, a sum of: the number of intra-frequency NR MOs without MG configured FR2 SCell(s) (e.g., SCC 160 and SCC 550); the number of inter-RAT NR In a CA scenario for UE 110 operating in FR1 and FR2 where (FR1 includes PSCell), some embodiments for CSSF values in an EN-DC network are shown in Table 4. CSSF in CA Scenario: FR1 and FR2 (FR1 PSCell). Example 500 of FIG. 5 supports this CA scenario where band 520 operating in FR1 includes PSCC 150 and SCC 160. Band 530 operating in FR2, includes SCC-NC 540 as well as SCC 550. Some embodiments include combinations of the above CA scenarios and thus, are not repeated here. For example: Column 1 is similar to Column 1 of Table 1; Column 3 is similar to Column 2 of Table 3; and Column 4 is similar to Column 3 of Table 3. Columns 2, 5, and 6 are similar to Column 4 and are not repeated here.

TABLE 4

CSSF in CA Scenario: FR1 and FR2 (FR1 PSCell)

| $CSSF_{outside\_gap, i}$ for FR1 PSCC | $CSSF_{outside\_gap, i}$ for FR1 SCC | $CSSF_{outside\_gap, i}$ for FR2 SCC where neighbor cell measurement is required | $CSSF_{outside\_gap, i}$ for FR2 SCC where neighbor cell measurement is not required | $CSSF_{outside\_gap, i}$ for inter-frequency MO with no MG | $CSSF_{outside\_gap, I}$ for inter-RAT NR measurement |
|---|---|---|---|---|---|
| '1' when only intra-frequency NR MO or only inter-RAT NR MO is configured on this PSCC; '2' when both intra-frequency NR MO and inter-RAT NR MO are configured on this PSCC | 2 × (Number of configured SCell(s) + number of inter-RAT NR measurement without MG + Y − 1) if $CSSF_{outside\_gap, i}$ = 2 for FR2 SCC where neighbor cell measurement is required; 2 × (Number of configured SCell(s) + number of inter-RAT NR measurement without MG + Y − 2) if $CSSF_{outside\_gap, i}$ = 4 for FR2 SCC where neighbor cell measurement is required. | '2' when only intra-frequency NR MO or only inter-RAT NR MO is configured on this SCC; '4' when both intra-frequency NR MO and inter-RAT NR MO are configured on this SCC (Note 3) | 2 × (Number of configured SCell(s) + number of inter-RAT NR measurement without MG + Y − 1) if $CSSF_{outside\_gap, i}$ = 2 for FR2 SCC where neighbor cell measurement is required; 2 × (Number of configured SCell(s) + n number of inter-RAT NR measurement without MG + Y − 2) if $CSSF_{outside\_gap, i}$ = 4 for FR2 SCC where neighbor cell measurement is required. | 2 × (Number of configured SCell(s) + number of inter-RAT NR measurement without MG + Y − 1) if $CSSF_{outside\_gap, i}$ = 2 for FR2 SCC where neighbor cell measurement is required; 2 × (Number of configured SCell(s) + number of inter-RAT NR measurement without MG + Y − 2) if $CSSF_{outside\_gap, i}$ = 4 for FR2 SCC where neighbor cell measurement is required. | 2 × (Number of configured SCell(s) + number of inter-RAT NR measurement without MG + Y − 1) if $CSSF_{outside\_gap, i}$ = 2 for FR2 SCC where neighbor cell measurement is required; 2 × (Number of configured SCell(s) + number of inter-RAT NR measurement without MG + Y − 2) if $CSSF_{outside\_gap, i}$ = 4 for FR2 SCC where neighbor cell measurement is required. |

In a CA scenario for UE 110 operating in FR1 and FR2 where (FR2 includes PSCell), some embodiments for CSSF values in an EN-DC network are shown in Table 5. CSSF in CA Scenario: FR1 and FR2 (FR2 PSCell). Example 100 can support this scenario PSCC 150 operates in FR2, and SCC 160 and/or SCC 180 operates in FR1. UE 110 performs functions similar to that discussed with regard to Table 1. CSSF in CA Scenario: FR1 above, but with a combination of FR1 and FR2 frequencies where PSCell operates in FR2. Some embodiments include combinations of the above CA scenarios and thus, are not repeated here. For example: Column 1 is similar to Column 2 of Table 1; and Column 2 is similar to Column 1 of Table 3. Columns 3, 4, and 5 are similar to Column 1 and are not repeated here.

In some embodiments, UE 110 determines the scaling factor (e.g., CSSF) independently counts inter-RAT NR MOs without MG from PN 130 from intra-frequency NR MOs without MG from SN 140 when the NR MOs without MG correspond to different frequencies, or if they correspond to the same frequency but cannot meet a merging rule criteria as described in clause 9.1.3.2 of 3GPP TS38.133. Some embodiments include UE 110 determining that an inter-RAT NR MO without MG configured by PN 130 and an intra-frequency NR MO without MG configured by SN 140 correspond to the same frequency, and the merging rule criteria are satisfied, UE 110 counts the inter-RAT NR MO without MG and the intra-frequency NR MO without MG once, for CSSF calculation and/or accumulation. Some

TABLE 5

CSSF in CA Scenario: FR1 and FR2 (FR2 PSCell)

| $CSSF_{outside\_gap, i}$ for FR1 SCC | $CSSF_{outside\_gap, i}$ for FR2 PSCC | $CSSF_{outside\_gap, i}$ for FR2 SCC where neighbor cell measurement is not required | $CSSF_{outside\_gap, i}$ for inter-frequency MO with no MG | $CSSF_{outside\_gap, I}$ for inter-RAT NR measurement |
|---|---|---|---|---|
| Number of configured SCell(s) + number of inter-RAT NR measurement without MG + Y | '1' when only intra-frequency NR MO or only inter-RAT NR MO is configured on this PSCC; '2' when both intra-frequency NR MO and inter-RAT NR MO are configured on this PSCC | Number of configured SCell(s) + number of inter-RAT NR measurement without MG + Y | Number of configured SCell(s) + number of inter-RAT NR measurement without MG + Y | Number of configured SCell(s) + number of inter-RAT NR measurement without MG + Y | embodiments include UE 110 determining that an inter-frequency NR MO without MG configured from SN 140 and an inter-RAT MO without MG configured from PN 130 correspond to the same frequency, and the merging rule criteria are satisfied. Thus, UE 110 counts the inter-RAT NR MO without MG and inter-frequency NR MO without MG once, for CSSF calculation and/or accumulation.

Figure 7:
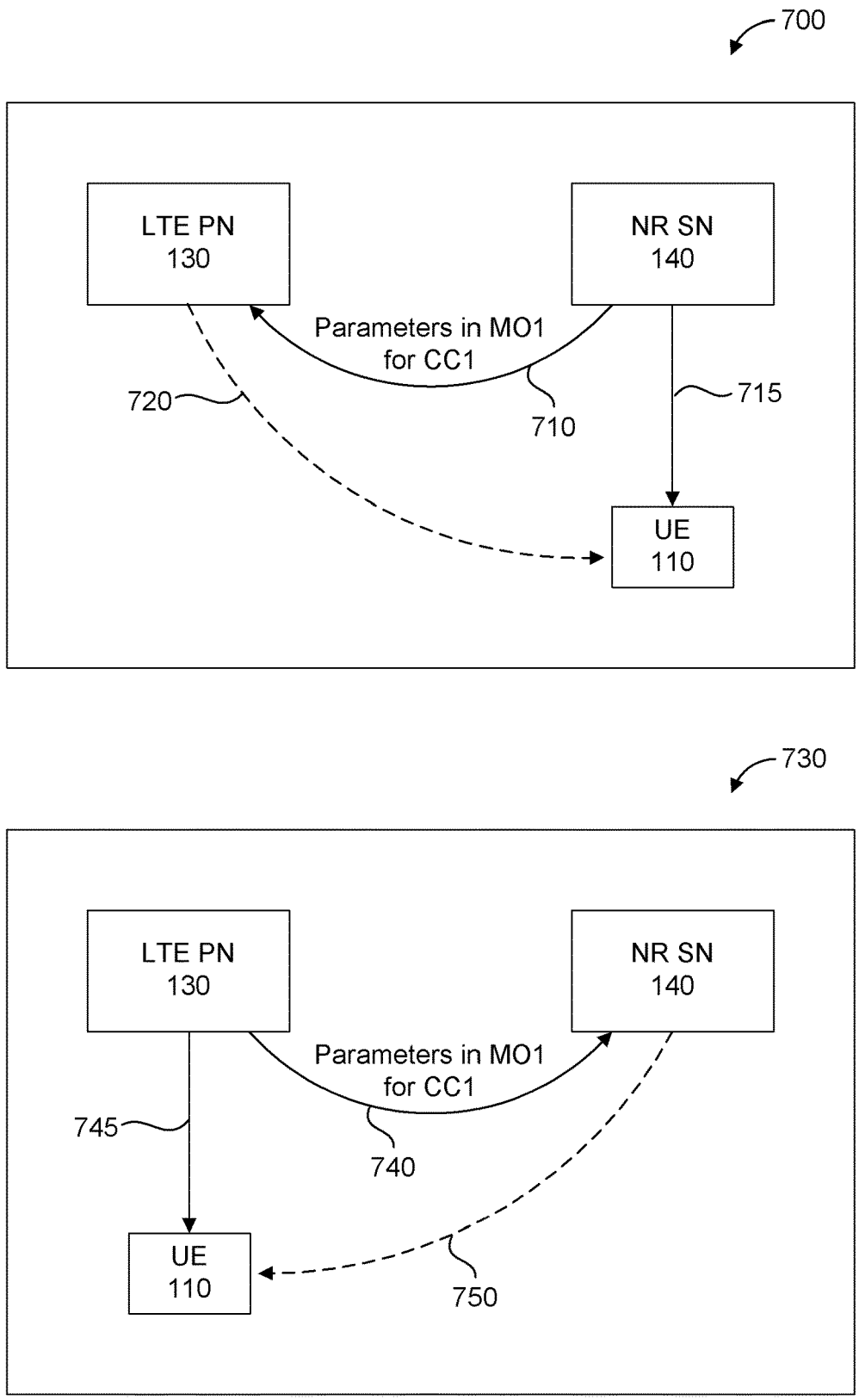
FIG. 7 illustrates an example of coordination among systems supporting RRM scaling factor enhancement without MG, according to some embodiments of the disclosure.

FIG. 7 illustrates examples 700 and 730 of coordination among systems supporting RRM scaling factor enhancement without MG, according to some embodiments of the disclosure. As a convenience and not a limitation, example 700, may be described with elements of other figures herein. In example 700, SN 140 and PN 130 communicate to avoid NR MO without MG configurations on the same frequency. Having NR MO without MG configurations from SN 140 and PN 130 correspond to different frequencies enables UE 110 to count inter-RAT NG MO without MG configured by PN 130 independently from intra-frequency NR MO without MG configured by SN 140.

At 710, SN 140 transmits first parameters corresponding to a first intra-frequency NR MO without MG corresponding to frequency CC1. PN 130 receives the first parameters and configures a second inter-RAT NR MO without MG corresponding to CC1, where the second parameters corresponding to the second inter-RAT NR MO without MG and the first parameters together satisfy the merging rule criteria.

At 715, SN 140 transmits a signal to UE 110 to configure UE 110 with the first intra-frequency NR MO without MG corresponding to frequency CC1.

At 720, PN 130 transmits the second intra-frequency NR MO without MG corresponding to CC1. Some embodiments include UE 110 counting the first intra-frequency NR MO without MG corresponding to CC1, and the second inter-RAT NR MO without MG also corresponding to CC1, as a single NR MO without MG. This saves UE 110 resources and time from measuring one less NR MO without MG. After completing the single NR MO without MG corresponding to CC1, UE 110 can transmit corresponding reports to PN 130 and SN 140.

In example 730, is similar to example 700.

At 740, PN 130 transmits first parameters corresponding to a first inter-RAT NR MO without MG corresponding to frequency CC1. SN 140 receives the first parameters and configures a second intra-frequency NR MO without MG corresponding to CC1, where the second parameters corresponding to the second intra-frequency NR MO without MG and the first parameters satisfy the merging rule criteria.

At 745, PN 130 transmits a signal to UE 110 to configure UE 110 with the first inter-RAT NR MO without MG corresponding to frequency CC1.

At 750, SN 140 transmits the second intra-frequency NR MO without MG corresponding to CC1. Some embodiments include UE 110 counting the second intra-frequency NR MO without MG corresponding to CC1, and the first inter-RAT NR MO without MG also corresponding to CC1, as a single NR MO without MG. This saves UE 110 resources and time from measuring one less NR MO without MG. After completing the single NR MO without MG corresponding to CC1, UE 110 can transmit corresponding reports to PN 130 and SN 140.

In some embodiments SN 140 and PN 130 communicate and agree that PN 130 does not configure inter-RAT NR MO without MG. Accordingly, SN configures intra-frequency NR MO without MG as well as intra-frequency NR MO without MG for UE 110. Thus, UE 110 determines a corresponding CSSF scaling factor outside MG based on the intra-frequency NR MO without MG as well as intra-frequency NR MO without MG configured by SN 140. In some embodiments, SN 140 and PN 130 communicate and agree that SN 140 does not configure intra-frequency NR MO without MG or inter-frequency NR MO without MG. Accordingly, PN 130 configures UE 110 with inter-RAT NR MO without MG. Thus, UE 110 determines a corresponding CSSF scaling factor outside MG based on the inter-RAT NR MO without MG configured by PN 130.

Figure 8:
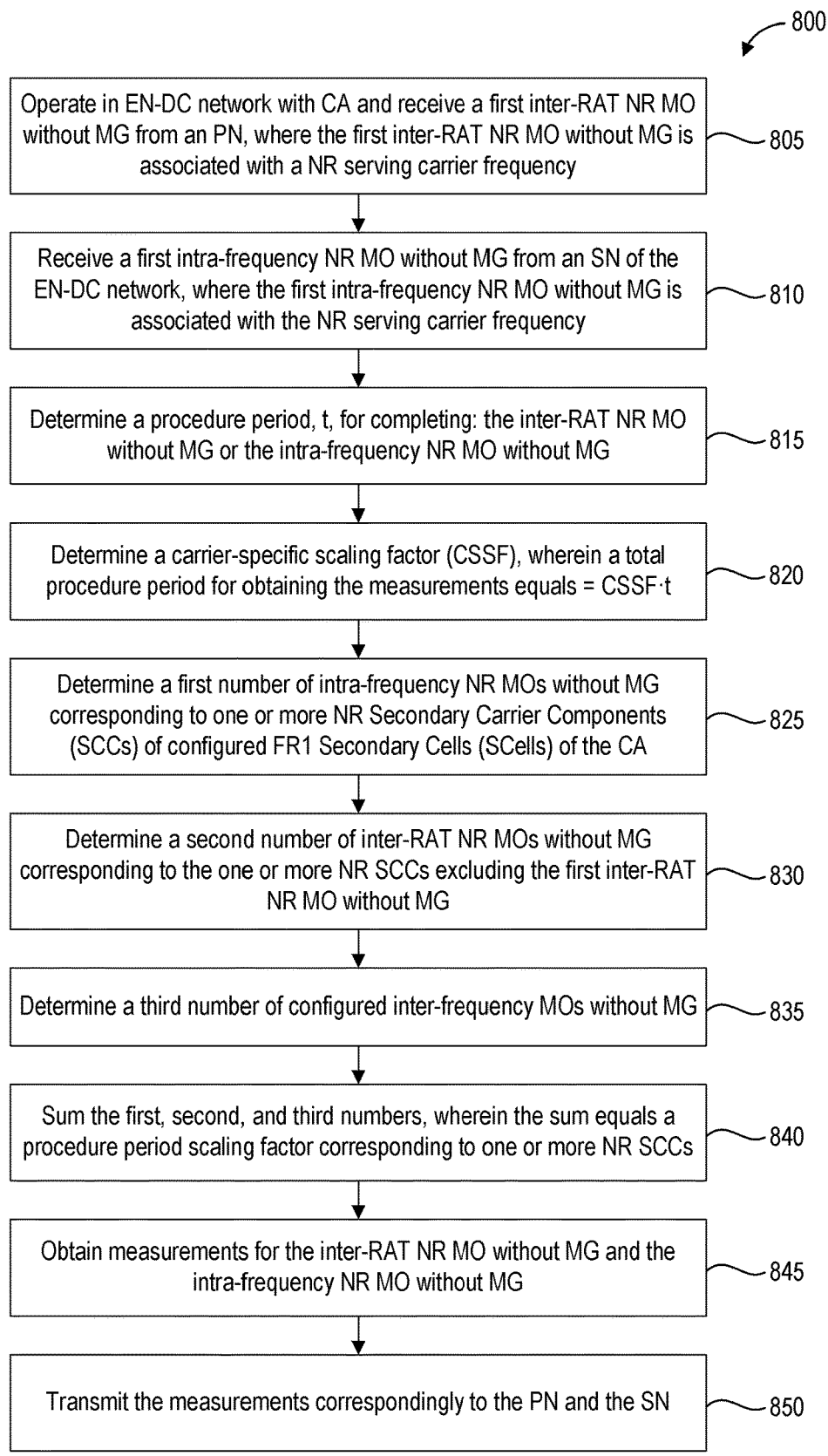
FIG. 8 illustrates a method for supporting RRM scaling factor enhancement without MG with Carrier Aggregation (CA) in a frequency range, according to some embodiments of the disclosure.

FIG. 8 illustrates method 800 for supporting RRM scaling factor enhancement without MG with CA in a frequency range, according to some embodiments of the disclosure. As a convenience and not a limitation, method 800, may be described with elements of other figures herein. The frequency range can be FR1 as described in Table 1. CSSF in CA Scenario: FR1. Method 800 can be performed by UE 110 or system 200 of FIG. 2.

At 805, UE 110 operates in an EN-DC network with CA, and receives a first inter-RAT NR MO without MG from a PN of the EN-DC network, where the first inter-RAT NR MO without MG corresponds to a NR serving carrier frequency. In some embodiments, the NR serving carrier frequency is within: an NR PSCC or a NR SCC, where the NR SCC includes a component carrier within: an NR SCC configured with neighbor cell measurements (SCC-NC), or an NR SCC configured with serving cell measurements. In some embodiments the inter-RAT NR MO without MG corresponds to the NR serving carrier frequency or one or more NR inter-frequencies, where the one or more NR inter-frequencies are different than a NR serving carrier frequency.

At 810, UE 110 receives a first intra-frequency NR MO without MG from a Secondary Node (SN) of the EN-DC network, where the first intra-frequency NR MO without MG is associated with the NR serving carrier frequency.

At 815, where the CA comprises Frequency Range 1 (FR1) frequencies, and where the NR serving carrier frequency is within an NR Primary Secondary Component Carrier (PSCC), UE 110 determines a procedure period, T, for completing: the inter-RAT NR MO without MG or the intra-frequency NR MO without MG.

At 820, based at least on the PSCC, the received inter-RAT NR MO without MG, and received the intra-frequency NR MO without MG, UE 110 determines a carrier-specific scaling factor (CSSF), where a total procedure period for obtaining the measurements equals=CSSF·T.

At 825, UE 110 determines a first number of intra-frequency NR MOs without MG corresponding to one or more NR SCCs of configured FR1 SCells of the CA.

At 830, UE 110 determines a second number of inter-RAT NR MOs without MG corresponding to the one or more NR SCCs excluding the first inter-RAT NR MO without MG;

At 835, UE 110 determines a third number of configured inter-frequency MOs without MG.

At 840, UE 110 sums the first, second, and third numbers, wherein the sum equals a procedure period scaling factor corresponding to one or more NR SCCs.

At 845, based at least on the procedure period scaling factor, UE 110 obtains measurements for the inter-RAT NR MO without MG and the intra-frequency NR MO without MG.

At 850, UE 110 transmits the measurements correspondingly to the PN and the SN.

Figure 9:
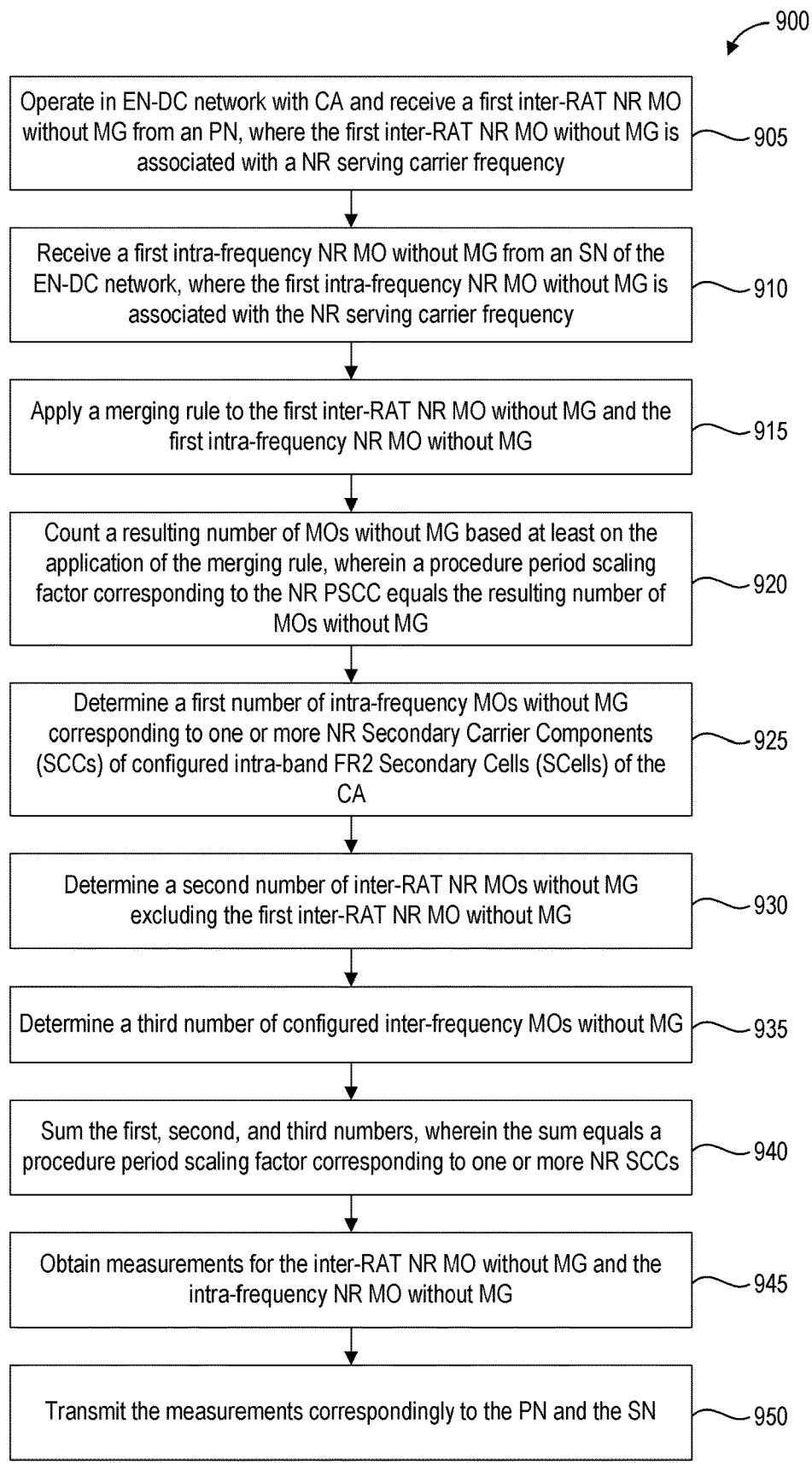
FIG. 9 illustrates a method for supporting RRM scaling factor enhancement without MG with CA in a frequency range with a merging rule applied, according to some embodiments of the disclosure.

FIG. 9 illustrates method 900 for supporting RRM scaling factor enhancement without MG with CA in a frequency range with a merging rule applied, according to some embodiments of the disclosure. As a convenience and not a limitation, method 900, may be described with elements of other figures herein. The frequency range can be FR1 as described in Table 2. CSSF in CA Scenario: Intra-band FR2. Method 900 can be performed by UE 110 or system 200 of FIG. 2.

At 905, UE 110 operates in an EN-DC network with CA where the CA includes intra-band FR2 frequencies, where a neighbor cell measurement is not required in the intra-band FR2 frequencies, and where the NR serving carrier frequency is within a NR PSCC. UE 110 receives a first inter-RAT NR MO without MG from a PN of the EN-DC network, where the first inter-RAT NR MO without MG is associated with a NR serving carrier frequency.

At 910, UE 110 receives a first intra-frequency NR MO without MG from a SN of the EN-DC network, where the first intra-frequency NR MO without MG is associated with the same NR serving carrier frequency.

At 915, UE 110 applies a merging rule to the first inter-RAT NR MO without MG and the first intra-frequency NR MO without MG. In some embodiments the merging rule is not applied and the first inter-RAT NR MO without MG and the first intra-frequency NR MO without MG are counted separately (e.g., the count is not merged.)

At 920, UE 110 counts a resulting number of MOs without MG based at least on the application of the merging rule, wherein a procedure period scaling factor corresponding to the NR PSCC equals the resulting number of MOs without MG.

At 925, UE 110 determines a first number of intra-frequency MOs without MG corresponding to one or more NR SCCs of configured intra-band FR2 SCells of the CA.

At 930, UE 110 determines a second number of inter-RAT NR MOs without MG corresponding to the one or more NR SCCs of the configured intra-band FR2 SCells of the CA.

At 935, UE 110 determines a third number of configured inter-frequency MOs without MG.

At 940, UE 110 sums the first, second, and third numbers, where the sum equals a procedure period scaling factor corresponding to one or more NR SCCs.

At 945, UE 110 obtain measurements for the inter-RAT NR MO without MG and the intra-frequency NR MO without MG.

At 950, UE 110 transmits the measurements correspondingly to the PN and the SN.

Figure 10A:
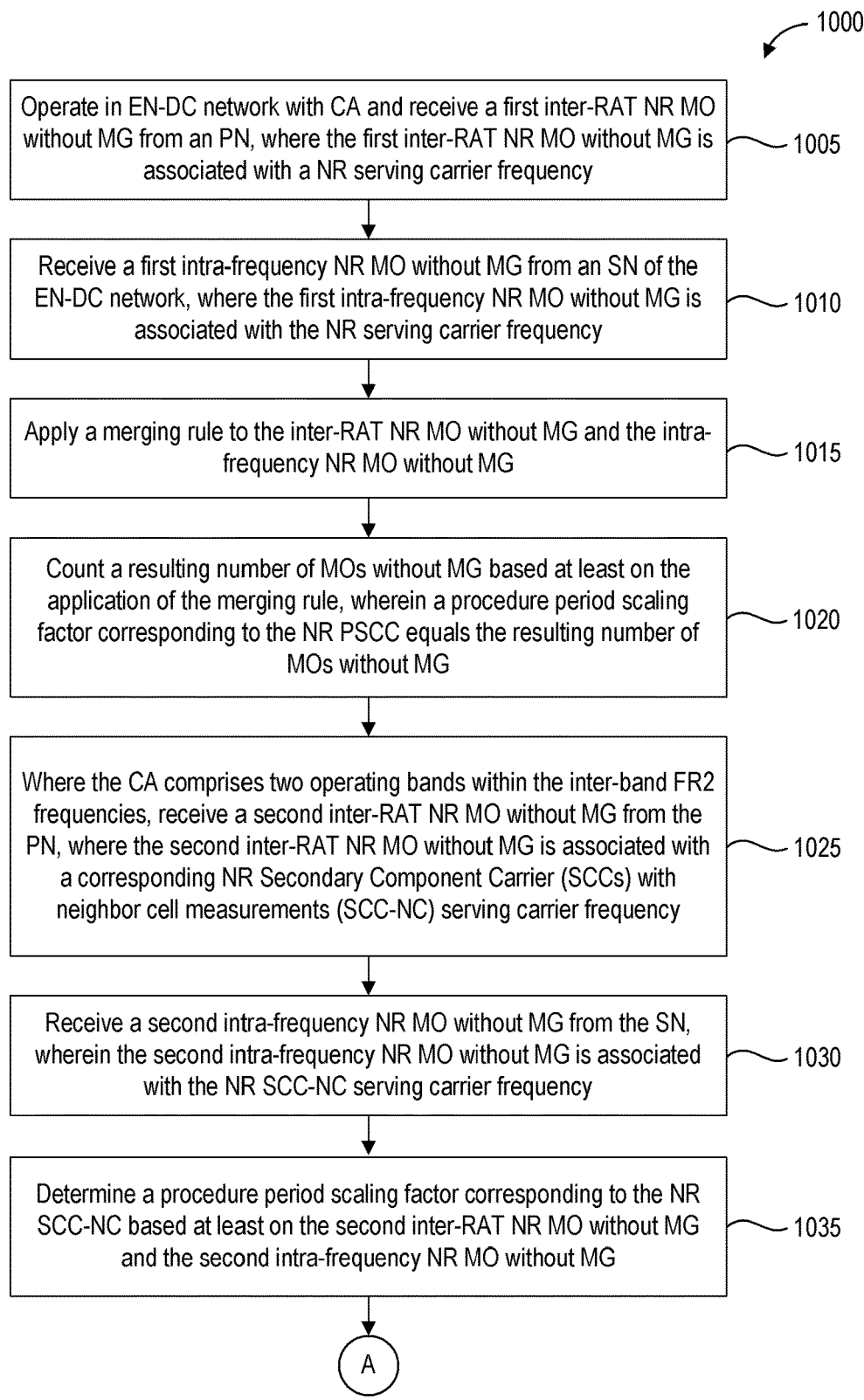
FIGS. 10A-10B illustrate a method for supporting RRM scaling factor enhancement without MG with CA with an SSC-NC, according to some embodiments of the disclosure.
Figure 10B:
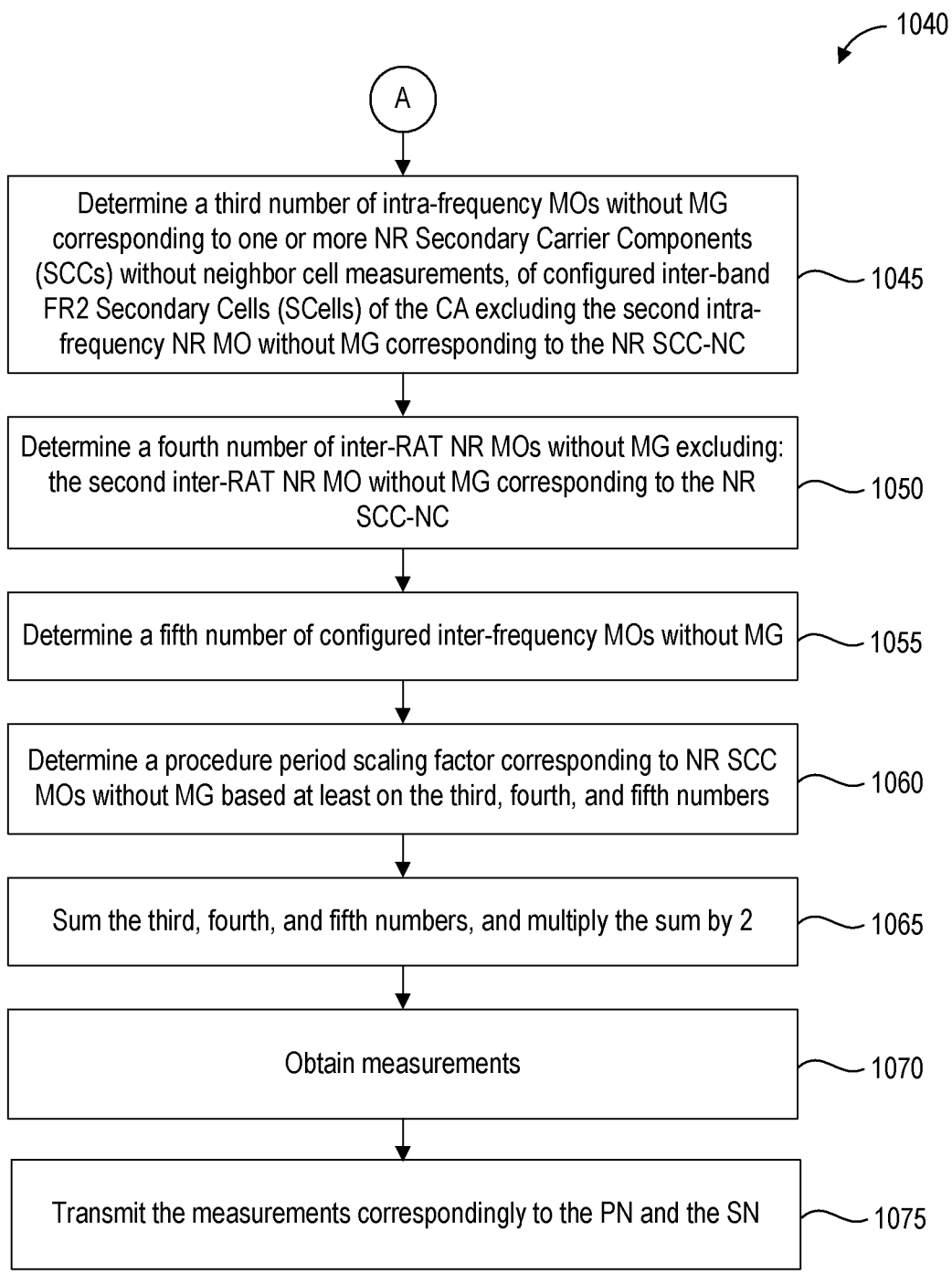

FIGS. 10A-10B illustrate method 1000 for supporting RRM scaling factor enhancement without MG with CA with an SSC-NC, according to some embodiments of the disclosure. Method 1000 continues in FIG. 10B as method 1040. As a convenience and not a limitation, method 1000 and 1040, may be described with elements of other figures herein. The frequency range can be inter-frequency FR2 as described in Table 3. CSSF in CA Scenario: Inter-band FR2. Methods 1000 and 1040 can be performed by UE 110 or system 200 of FIG. 2.

At 1005, UE 110 operates in an EN-DC network with CA where the CA includes inter-band Frequency Range 2 (FR2) frequencies, where the NR serving carrier frequency is within an NR PSCC. UE 110 receives a first inter-RAT NR MO without MG from a PN of the EN-DC network, where the first inter-RAT NR MO without MG is associated with a NR serving carrier frequency.

At 1010, UE 110 receives a first intra-frequency NR MO without MG from a SN of the EN-DC network, where the first intra-frequency NR MO without MG is associated with the same NR serving carrier frequency.

At 1015, UE 110 apples a merging rule to the inter-RAT NR MO without MG and the intra-frequency NR MO without MG.

At 1020, UE 110 counts a resulting number of MOs without MG based at least on the application of the merging rule, wherein a procedure period scaling factor corresponding to the NR PSCC equals the resulting number of MOs without MG.

At 1025, where the CA comprises two operating bands within the inter-band FR2 frequencies, UE 110 receives a second inter-RAT NR MO without MG from the PN, where the second inter-RAT NR MO without MG is associated with a corresponding NR SCCs with neighbor cell measurements (SCC-NC) serving carrier frequency.

At 1030, UE 110 receives a second intra-frequency NR MO without MG from the SN, wherein the second intra-frequency NR MO without MG is associated with a corresponding NR SCC-NC serving carrier frequency.

At 1035, UE 110 determines a procedure period scaling factor corresponding to the NR SCC-NC based at least on the second inter-RAT NR MO without MG and the second intra-frequency NR MO without MG. For example, to determine the procedure period scaling factor corresponding to the NR SCC-NC, UE 110 sums the second inter-RAT NR MO without MG and the second intra-frequency NR MO without MG to yield the procedure period scaling factor.

Method 1000 continues on FIG. 10B with method 1040.

At 1045, UE 110 determines a third number of intra-frequency MOs without MG corresponding to one or more NR SCCs without neighbor cell measurements, of configured inter-band FR2 SCells of the CA excluding the second intra-frequency NR MO corresponding to the NR SCC-NC.

At 1050, UE 110 determines a fourth number of inter-RAT NR MOs without MG excluding: the second inter-RAT NR MO without MG corresponding to the NR SCC-NC.

At 1055, UE 110 determines a fifth number of configured inter-frequency MOs without MG.

At 1060, UE 110 determines a procedure period scaling factor corresponding to NR SCC MOs without MG based at least on the third, fourth, and fifth numbers.

At 1065, to determine the procedure period scaling factor corresponding to NR SCC MOs without MG, UE 110 sums the third, fourth, and fifth numbers, and multiplies the sum by 2.

At 1070, UE 110 obtains measurements accordingly.

At 1075, UE 110 transmits the measurements correspondingly to the PN and the SN.

Figure 11:
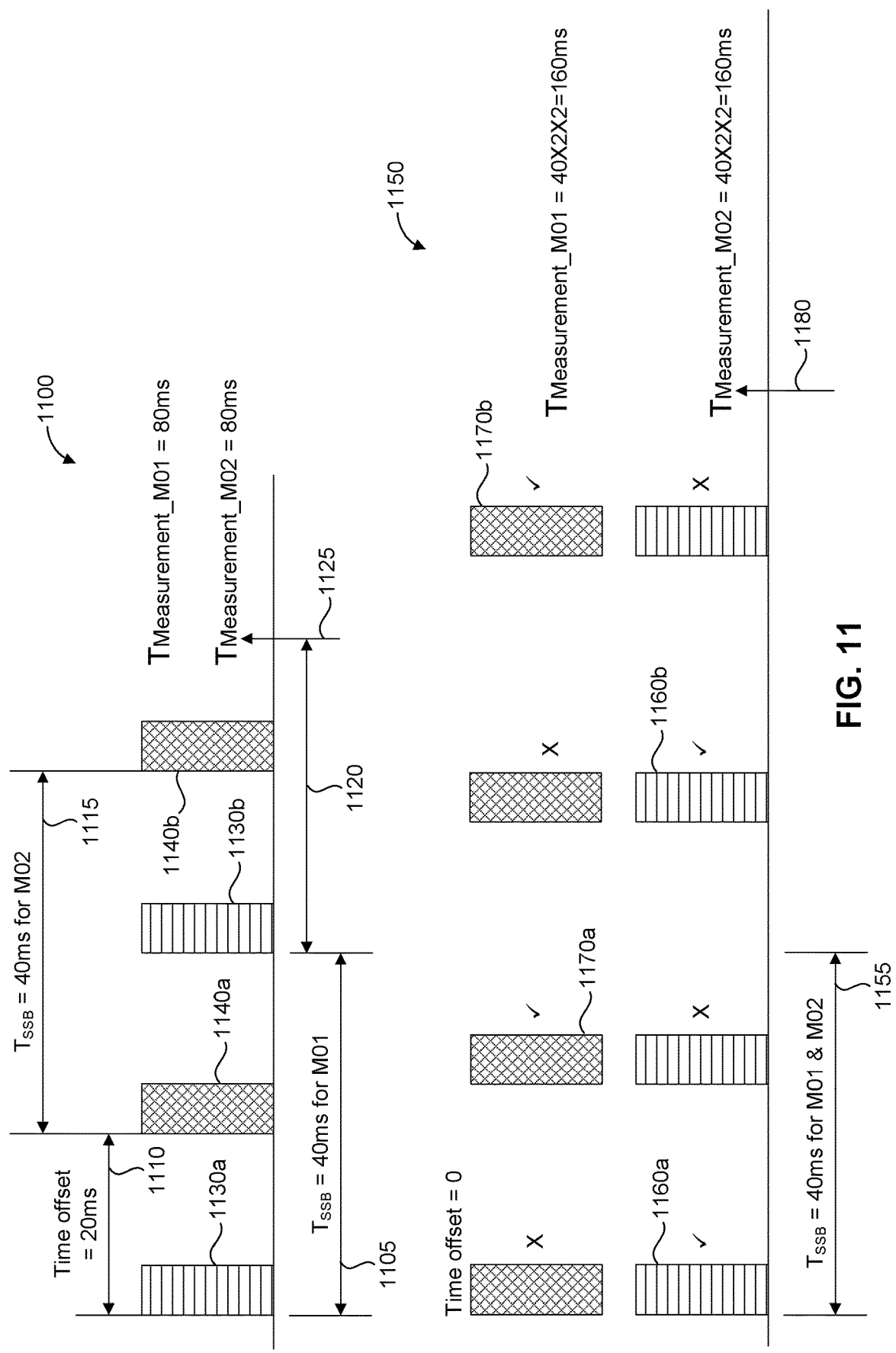
FIG. 11 illustrates an example of combining NR MOs without MG at a same frequency when a merging rule is not satisfied, in accordance with some embodiments of the disclosure.

FIG. 11 illustrates example 1100 of combining NR MOs without MG at a same frequency when a merging rule is not satisfied, in accordance with some embodiments of the disclosure. As a convenience and not a limitation, example 1100, may be described with elements of other figures herein. In some embodiments UE 110 counts inter-RAT NR MO without MG configured by PN 130 independently from intra-frequency NR MO without MG configured by SN 140 if any of the following conditions are satisfied: The above NR MO without MG are on different frequencies or if they are on the same frequency but the merging rule criteria are not satisfied. In some embodiments, UE 110 can compare a first parameter of the inter-RAT NR MO without MG and a second parameter from the intra-frequency NR MO without MG. Even if UE 110 determines that the first parameter and the second parameter are different and thus do not satisfy the merging rule criteria, if the first parameter and the second parameter do not overlap in the time domain, UE 110 can count the inter-RAT NR MO without MG and the intra-frequency NR MO without MG as a single NR MO without MG.

Example 1100 includes inter-RAT NR MO without MG measurements 1130a and 1130b and intra-frequency NR MO without MG measurements 1140a and 1140b. A baseline processing period is assumed to be 80 ms. The time offset 1100 is 20 ms and the measurement period for measuring SSB, TSSB=40 ms, shown as 1105 and 1120. Because inter-RAT NR MO without MG measurements 1130a and 1130b do not overlap in the time domain with intra-frequency NR MO without MG measurements 1140a and 1140b, the time for obtaining measurements are satisfied. Examples of parameters include but are not limited to a Synchronization Signal Block (SSB)-based Measurement Timing configuration (SMTC), a Received Signal Strength Indicator (RSSI) measurement timing configuration (RMTC), or a RSSI measurement. Example 1150 illustrates an example where the respective measurements 1160a and 1160b coincide in time with measurements 1170a and 1170b. Thus UE 110 has to alternate measurements resulting in a scale factor of 2 yielding 160 ms.

Figure 12:
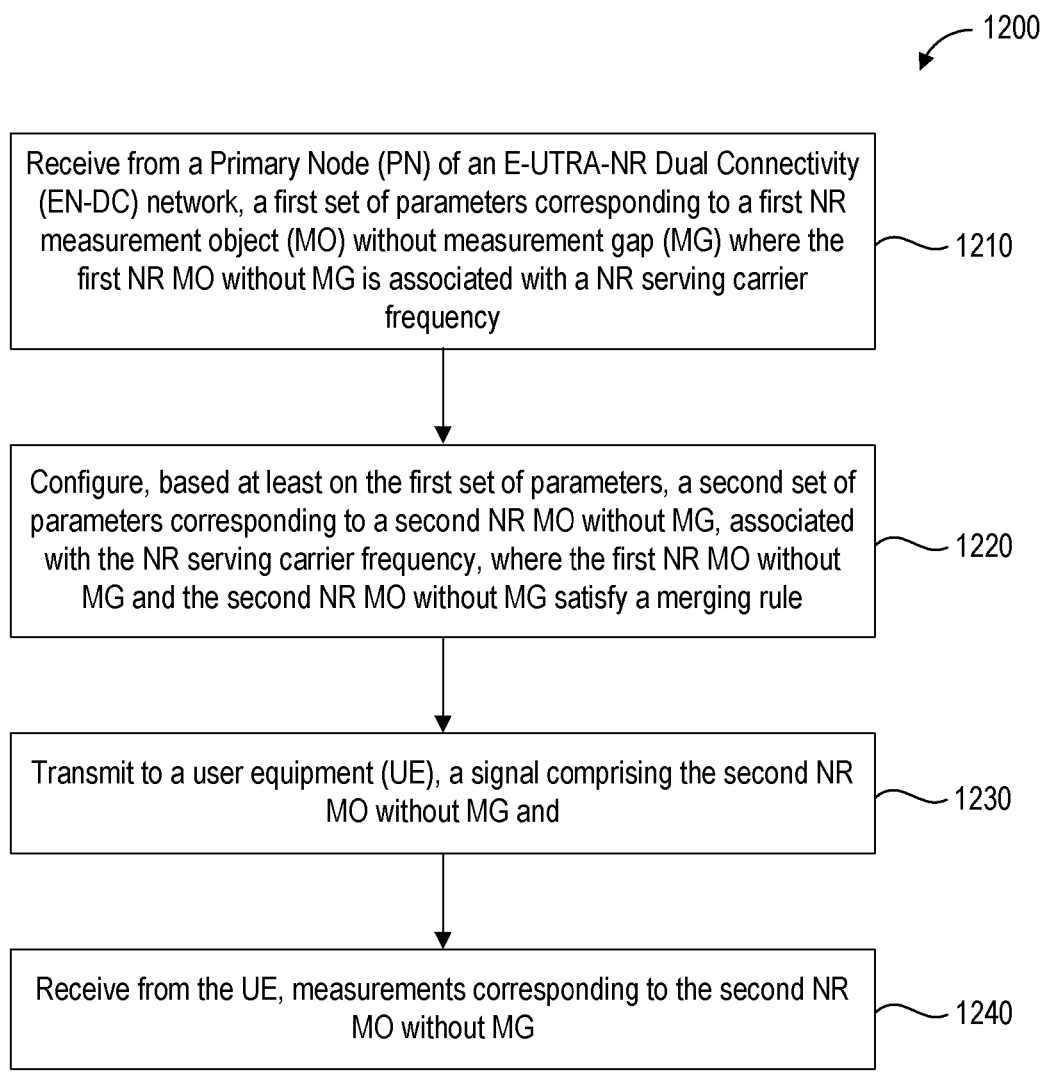
FIG. 12 illustrates a method for coordination among systems supporting RRM scaling factor enhancement without MG, according to some embodiments of the disclosure.

FIG. 12 illustrates method 1200 for coordination among systems supporting RRM scaling factor enhancement without MG, according to some embodiments of the disclosure. As a convenience and not a limitation, method 1200, may be described with elements of other figures herein. Method 1200 can be performed by a 5G Node B (gNB) of NR, SN 140, or system 200.

At 1210, SN 140 receives from a PN of an EN-DC network, a first set of parameters corresponding to a first NR measurement object (MO) without measurement gap (MG) where the first NR MO without MG is associated with a NR serving carrier frequency.

At 1220, SN 140 configures, based at least on the first set of parameters, a second set of parameters corresponding to a second NR MO without MG, associated with the same NR serving carrier frequency, where the first NR MO without MG and the second NR MO without MG satisfy a merging rule.

At 1230, SN 140 transmits to a UE, a signal comprising the second NR MO without MG.

At 1240, SN 140 receives from the UE, measurements corresponding to the second NR MO without MG.

Figure 13:
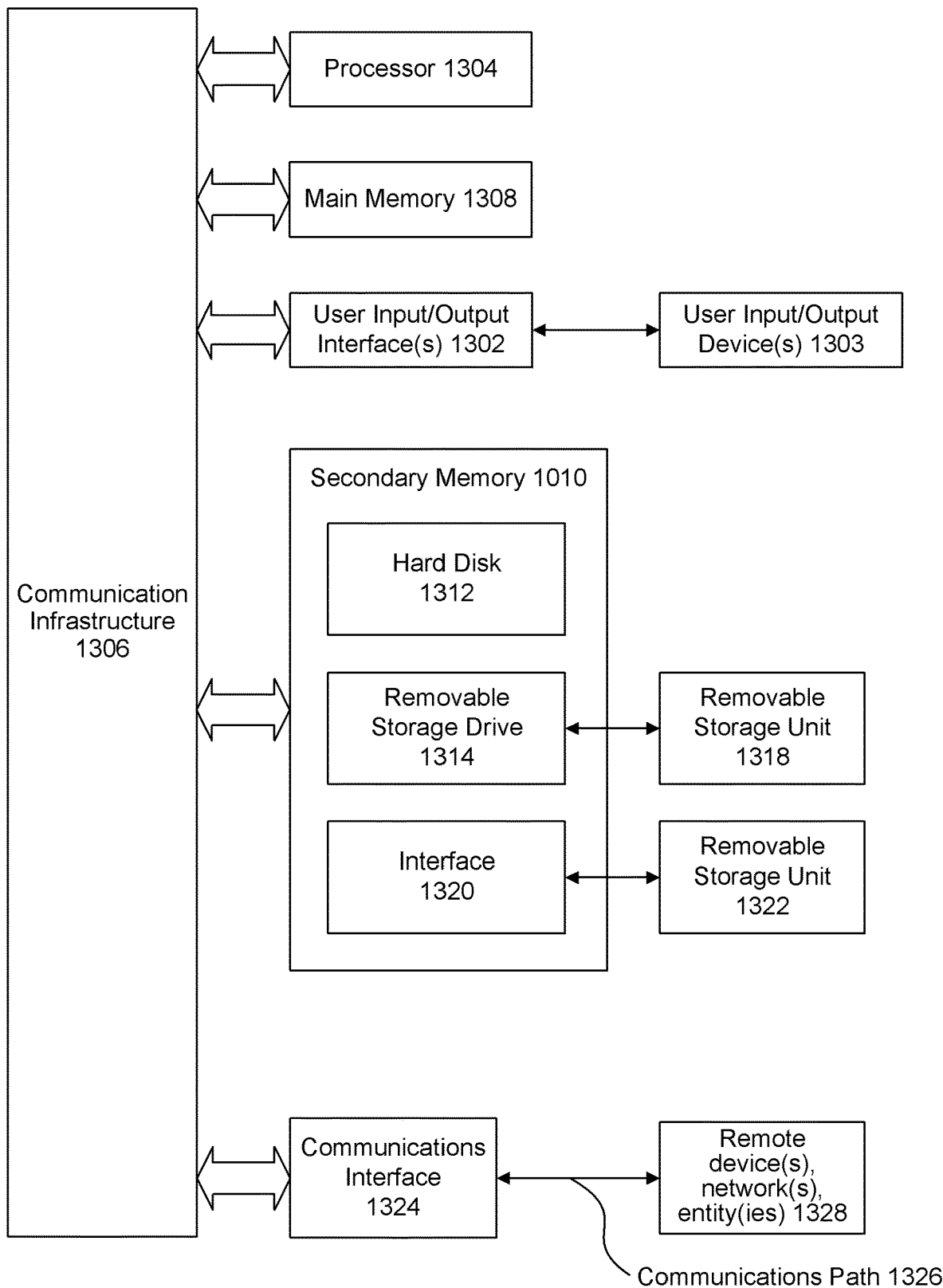
FIG. 13 is an example computer system for implementing some embodiments or portion(s) thereof.

Various embodiments can be implemented, for example, using one or more well-known computer systems, such as computer system 1300 shown in FIG. 13. Computer system 1300 can be any well-known computer capable of performing the functions described herein. For example, and without limitation, UE 110, PN 130, and SN 140 of FIG. 1; system 200 of FIG. 2; perform the functions of examples of FIGS. 3-7 and 11; and perform the methods of FIGS. 8-10A, 10B, and 12 (and/or other apparatuses and/or components shown in the figures) may be implemented using computer system 1300, or portions thereof.

Computer system 1300 includes one or more processors (also called central processing units, or CPUs), such as a processor 1304. Processor 1304 is connected to a communication infrastructure or bus 1306. One or more processors 1304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 also includes user input/output device(s) 1303, such as monitors, keyboards, pointing devices, etc., that communicate with communication infrastructure 1306 through user input/output interface(s) 1302.

Computer system 1300 also includes a main or primary memory 1308, such as random access memory (RAM). Main memory 1308 may include one or more levels of cache. Main memory 1308 has stored therein control logic (e.g., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to some embodiments, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1300, main memory 1308, secondary memory 1310 and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 13. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A user equipment (UE) comprising:
    a transceiver configured to operate in an E-UTRA-New Radio (NR) Dual Connectivity (EN-DC) network with Carrier Aggregation (CA); and
    a processor coupled to the transceiver, configured to:
        receive, via the transceiver, a first inter-Radio Access Technology (RAT) NR measurement object (MO) without measurement gap (MG) from a Primary Node (PN) of the EN-DC network, wherein the first inter-RAT NR MO without MG is associated with an NR serving carrier frequency;
        receive, via the transceiver, a first intra-frequency NR MO without MG from a Secondary Node (SN) of the EN-DC network, wherein the first intra-frequency NR MO without MG is associated with the NR serving carrier frequency;
        obtain measurements for the first inter-RAT NR MO without MG and the first intra-frequency NR MO without MG; and
        transmit, via the transceiver, the measurements correspondingly to the PN and the SN.

2. The UE of claim 1, wherein the NR serving carrier frequency is within: an NR Primary Secondary Component Carrier (PSCC) or an NR Secondary Component Carrier (SCC), wherein the NR SCC comprises a component carrier within: an NR SCC configured with neighbor cell measurements (SCC-NC), or an NR SCC configured with serving cell measurements.

3. The UE of claim 2, wherein the first inter-RAT NR MO without MG corresponds to the NR serving carrier frequency or one or more NR inter-frequencies, wherein the one or more NR inter-frequencies are different than the NR serving carrier frequency.

4. The UE of claim 1, wherein the processor is further configured to:
    wherein the CA comprises Frequency Range 1 (FR1) frequencies, and wherein the NR serving carrier frequency is within an NR Primary Secondary Component Carrier (PSCC),
    determine a procedure period, T, for completing: the first inter-RAT NR MO without MG or the first intra-frequency NR MO without MG;
    based at least on the NR PSCC, the received first inter-RAT NR MO without MG, and the received first intra-frequency NR MO without MG, determine a carrier-specific scaling factor (CSSF), wherein a total procedure period for obtaining the measurements equals=CSSF·T.

5. The UE of claim 4, wherein the processor is further configured to:
    determine a first number of intra-frequency NR MOs without MG corresponding to one or more NR Secondary Carrier Components (SCCs) of configured FR1 Secondary Cells (SCells) of the CA;
    determine a second number of inter-RAT NR MOs without MG corresponding to the one or more NR SCCs;
    determine a third number of configured inter-frequency MOs without MG; and
    sum the first, second, and third numbers, wherein the sum equals a procedure period scaling factor corresponding to the one or more NR SCCs.

6. The UE of claim 1, wherein the processor is further configured to:
    wherein the CA comprises intra-band Frequency Range 2 (FR2) frequencies, wherein a neighbor cell measurement is not required in the intra-band FR2 frequencies, and wherein the NR serving carrier frequency is within an NR Primary Secondary Component Carrier (PSCC),
    apply a merging rule to the first inter-RAT NR MO without MG and the first intra-frequency NR MO without MG; and
    count a resulting number of MOs without MG based at least on the application of the merging rule, wherein a procedure period scaling factor corresponding to the NR PSCC equals the resulting number of MOs without MG.

7. The UE of claim 6, wherein the processor is further configured to:
    determine a first number of intra-frequency MOs without MG corresponding to one or more NR Secondary Carrier Components (SCCs) of configured intra-band FR2 Secondary Cells (SCells) of the CA;
    determine a second number of inter-RAT NR MOs without MG excluding the first inter-RAT NR MO without MG;
    determine a third number of configured inter-frequency MOs without MG; and
    sum the first, second, and third numbers, wherein the sum equals a procedure period scaling factor corresponding to the one or more NR SCCs.

8. The UE of claim 1, wherein the processor is further configured to:
    wherein the CA comprises inter-band Frequency Range 2 (FR2) frequencies, wherein the NR serving carrier frequency is within an NR Primary Secondary Component Carrier (PSCC), apply a merging rule to the first inter-RAT NR MO without MG and the first intra-frequency NR MO without MG; and
    count a resulting number of MOs without MG based at least on the application of the merging rule, wherein a procedure period scaling factor corresponding to the NR PSCC equals the resulting number of MOs without MG.

9. The UE of claim 8, wherein the processor is further configured to:
    wherein the CA comprises two operating bands within the inter-band FR2 frequencies, receive, via the transceiver, a second inter-RAT NR MO without MG from the PN, wherein the second inter-RAT NR MO without MG is associated with a corresponding NR Secondary Component Carrier (SCCs) with neighbor cell measurements (SCC-NC) serving carrier frequency;
    receive, via the transceiver, a second intra-frequency NR MO without MG from the SN, wherein the second intra-frequency NR MO without MG is associated with the NR SCC-NC serving carrier frequency; and
    determine a procedure period scaling factor corresponding to the NR SCC-NC based at least on the second inter-RAT NR MO without MG and the second intra-frequency NR MO without MG.

10. The UE of claim 9, wherein to determine the procedure period scaling factor corresponding to the NR SCC-NC, the processor is configured to:
    sum the second inter-RAT NR MO without MG and the second intra-frequency NR MO without MG.

11. The UE of claim 9, wherein the processor is further configured to:
  determine a third number of intra-frequency MOs without MG corresponding to one or more NR SCCs without neighbor cell measurements, of configured inter-band FR2 Secondary Cells (SCells) of the CA excluding the second intra-frequency NR MO without MG corresponding to the NR SCC-NC;
  determine a fourth number of inter-RAT NR MOs without MG excluding: the second inter-RAT NR MO without MG corresponding to the NR SCC-NC;
  determine a fifth number of configured inter-frequency MOs without MG; and
  determine a procedure period scaling factor corresponding to NR SCC MOs without MG based at least on the third, fourth, and fifth numbers.

12. The UE of claim 11, wherein to determine the procedure period scaling factor corresponding to the NR SCC MOs without MG, the processor is configured to:
  sum the third, fourth, and fifth numbers; and
  multiply the sum by 2.

13. A method for a user equipment (UE) comprising:
  receiving a first inter-Radio Access Technology (RAT) NR measurement object (MO) without measurement gap (MG) from a Primary Node (PN) of an E-UTRA-New Radio (NR) Dual Connectivity (EN-DC) network with Carrier Aggregation (CA), wherein the first inter-RAT NR MO without MG is associated with a NR serving carrier frequency;
  receiving a first intra-frequency NR MO without MG from a Secondary Node (SN) of the EN-DC network, wherein the first intra-frequency NR MO without MG is associated with the NR serving carrier frequency;
  obtaining measurements for the first inter-RAT NR MO without MG and the first intra-frequency NR MO without MG; and
  transmitting the measurements correspondingly to the PN and the SN.

14. The method of claim 13, further comprising:
  wherein the CA comprises Frequency Range 1 (FR1) frequencies, and wherein the NR serving carrier frequency is within an NR Primary Secondary Component Carrier (PSCC),
  determining a procedure period scaling factor corresponding to the NR PSCC based at least on the first inter-RAT NR MO without MG and the first intra-frequency NR MO without MG.

15. The method of claim 14, further comprising:
  determining a first number of intra-frequency NR MOs without MG corresponding to one or more NR Secondary Carrier Components (SCCs) of configured FR1 Secondary Cells (SCells) of the CA;
  determining a second number of inter-RAT NR MOs without MG corresponding to the one or more NR SCCs excluding the first inter-RAT NR MO without MG;
  determining a third number of configured inter-frequency MOs without MG; and
  summing the first, second, and third numbers, wherein the sum equals a procedure period scaling factor corresponding to the one or more NR SCCs.

16. The method of claim 14, wherein the determining the procedure period scaling factor corresponding to the NR PSCC comprises:
  applying a merging rule to the first inter-RAT NR MO without MG and the first intra-frequency NR MO without MG; and
  based at least on the application of the merging rule, determining a resulting number of MOs without MG, wherein the resulting number of MOs without MG equals the procedure period scaling factor corresponding to the NR PSCC.

17. The method of claim 13, further comprising:
  wherein the CA comprises inter-band Frequency Range 2 (FR2) frequencies, wherein the NR serving carrier frequency is within an NR Primary Secondary Component Carrier (PSCC), applying a merging rule to the first inter-RAT NR MO without MG and the first intra-frequency NR MO without MG; and
  counting a resulting number of MOs without MG based at least on the application of the merging rule, wherein a procedure period scaling factor corresponding to the NR PSCC equals the resulting number of MOs without MG.

18. The method of claim 17, further comprising:
  wherein the CA comprises two operating bands within the inter-band FR2 frequencies, receiving a second inter-RAT NR MO without MG from the PN, wherein the second inter-RAT NR MO without MG is associated with a corresponding NR Secondary Component Carrier (SCCs) with neighbor cell measurements (SCC-NC) serving carrier frequency;
  receiving a second intra-frequency NR MO without MG from the SN, wherein the second intra-frequency NR MO without MG is associated with the NR SCC-NC serving carrier frequency; and
  determining a procedure period scaling factor corresponding to the NR SCC-NC based at least on the second inter-RAT NR MO without MG and the second intra-frequency NR MO without MG.

19. The method of claim 18, wherein the determining the procedure period scaling factor corresponding to the NR SCC-NC, comprises:
  summing the second inter-RAT NR MO without MG and the second intra-frequency NR MO without MG.

20. A New Radio (NR) Secondary Node (SN) comprising:
  a transceiver configured to operate in an E-UTRA-NR Dual Connectivity (EN-DC) network with Carrier Aggregation (CA); and
  a processor coupled to the transceiver, configured to:
    receive, via the transceiver, from a Primary Node (PN) of the EN-DC network, a first set of parameters corresponding to a first NR measurement object (MO) without measurement gap (MG), wherein the first NR MO without MG is associated with an NR serving carrier frequency;
    configure, based at least on the first set of parameters, a second set of parameters corresponding to a second NR MO without MG, associated with the NR serving carrier frequency, wherein the first NR MO without MG and the second NR MO without MG satisfy a merging rule;
    transmit, via the transceiver, to a user equipment (UE), a signal comprising the second NR MO without MG; and
    receive, via the transceiver, from the UE, measurements corresponding to the second NR MO without MG.

* * * * *